(12) United States Patent
Hashimoto et al.

(10) Patent No.: US 7,787,216 B2
(45) Date of Patent: Aug. 31, 2010

(54) MAGNETIC HEAD SLIDER AND DISK DRIVE WITH REDUCED DAMAGE TO RECORDING MEDIUM

(75) Inventors: Kiyoshi Hashimoto, Kanagawa (JP);
Hidekazu Kohira, Kanagawa-ken (JP);
Takanori Yamazaki, Kanagawa-ken (JP); Koji Miyake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 599 days.

(21) Appl. No.: 11/317,331

(22) Filed: Dec. 22, 2005

(65) Prior Publication Data

US 2006/0139810 A1   Jun. 29, 2006

(30) Foreign Application Priority Data

Dec. 27, 2004  (JP)  ............................. 2004-377829

(51) Int. Cl.
*G11B 5/60* (2006.01)
(52) U.S. Cl. .................................. 360/235.6; 360/236.3
(58) Field of Classification Search ............... 360/235.6, 360/235.8, 235.9, 236.3, 235.7, 236.4, 236.5, 360/237
See application file for complete search history.

(56) References Cited

U.S. PATENT DOCUMENTS

| | | | | |
|---|---|---|---|---|
| 6,229,671 | B1 * | 5/2001 | Boutaghou et al. | 360/235.1 |
| 6,243,233 | B1 * | 6/2001 | Yamamoto et al. | 360/236.6 |
| 6,252,742 | B1 * | 6/2001 | Kameyama | 360/237 |
| 6,351,345 | B1 * | 2/2002 | Kameyama | 360/236.3 |
| 6,490,134 | B2 * | 12/2002 | Boutaghou | 360/235.7 |
| 6,535,353 | B2 * | 3/2003 | Boutaghou et al. | 360/235.1 |
| 6,538,849 | B1 * | 3/2003 | Fayeulle et al. | 360/236.3 |
| 6,771,468 | B1 * | 8/2004 | Levi et al. | 360/235.5 |
| 6,950,281 | B2 * | 9/2005 | Kameyama | 360/235 |
| 7,072,146 | B2 * | 7/2006 | Tokuyama et al. | 360/236.3 |
| 7,145,752 | B2 * | 12/2006 | Ueda et al. | 360/235.6 |
| 7,283,329 | B2 * | 10/2007 | Feliss et al. | 360/235.3 |
| 7,352,531 | B2 * | 4/2008 | Kameyama | 360/235.6 |
| 2002/0145828 | A1 * | 10/2002 | Mundt et al. | 360/235.6 |
| 2007/0025022 | A1 * | 2/2007 | Agari et al. | 360/235.8 |

FOREIGN PATENT DOCUMENTS

| | | |
|---|---|---|
| JP | 2001-256604 | 9/2001 |
| JP | 2002-319115 | 10/2002 |

* cited by examiner

*Primary Examiner*—Jefferson Evans
(74) *Attorney, Agent, or Firm*—Mahamedi Paradice Kreisman LLP; Christopher J. Brokaw

(57) ABSTRACT

Embodiments of the invention reduce damage to a disk recording medium when a slider flying above the disk recording medium inside a magnetic disk drive comes into contact with the disk recording medium due to slider vibration. In one embodiment, a magnetic head slider includes a front pad, a rear pad, and carbon protective films. The front pad includes a step bearing surface disposed on the side of a leading end and leading side rail surfaces formed on the step bearing surface. The rear pad includes a rear step bearing surface disposed across a deep groove surface from the front pad and a trailing side rail surface formed on the rear step bearing surface. The carbon protective films are formed on regions including vertices of slider corner portions, respectively. The leading side rail surfaces and the trailing side rail surface are formed substantially on the same level. The carbon protective films are harder than a slider base material and have a small coefficient of friction. The films have a film thickness of about 10 nm or more.

26 Claims, 12 Drawing Sheets

MAGNETIC HEAD SLIDER AND DISK DRIVE WITH REDUCED DAMAGE TO RECORDING MEDIUM

CROSS-REFERENCES TO RELATED APPLICATIONS

This application claims priority from Japanese Patent Application No. JP2004-377829, filed Dec. 27, 2004, the full disclosure of which is incorporated herein by reference.

BACKGROUND OF THE INVENTION

The present invention relates to a magnetic head slider in which measures are taken for reducing damage to a disk recording medium that could otherwise be caused when the magnetic head slider comes into contact with the disk recording medium as a result of vibration of the slider produced from disturbance. The present invention also relates to a disk drive mounted with the magnetic head slider.

A magnetic disk drive uses a magnetic head slider that flies above a spinning disk recording medium, while maintaining a microscopic distance (a flying height) therefrom. In general the magnetic head slider is provided at its trailing end with a magnetic transducer for reading and writing information from and to the disk recording medium. The magnetic disk drive is required to offer an even higher bit (recording in a circumferential direction) density and a track (recording in a radial direction) density to increase data storage capacity. Techniques for achieving a higher bit density include a technique in which the slider is made to fly above the disk recording medium in as close proximity as possible. To achieve such a stringent requirement for the low flying height, a negative pressure type slider is currently used. The negative pressure type slider offers an outstanding flying stability by making use of negative pressure acting on the slider to attract the slider onto the disk recording medium.

In conventional disk drives, requirements have been based on those for stationary computers. Accordingly, not so considerable importance has been attached to damage to the disk recording medium caused by the slider and arising from slider vibration produced from disturbance. However, there has lately been a rapid spread of notebook computers, portable music players, and the like. Accordingly, with a magnetic disk drive built into such a device, there is a stronger demand for a slider structure that produces only a small slider vibration when the structure is subjected to externally applied vibration and that ensures a stable flying height. There is also a demand for a slider structure that reduces damage to the disk recording medium caused by contact with the slider, occurring as a result of slider vibration.

The magnetic head slider disclosed in Patent Document 1 (Japanese Patent Laid-open No. 2001-14823) is well-known as a technique for reducing damage to the disk recording medium caused by contact with the slider. In the magnetic head slider disclosed in Patent Document 1, an edge portion of the slider includes a buffering layer for absorbing impact, thereby reducing contact damage to the disk recording medium by the slider.

In the magnetic disk slider disclosed in Patent Document 1, however, an alumina buffering layer is used as the buffering layer. The material alumina is softer than the material used for a protective layer or the like on the disk recording medium. Being softer than the protective layer on the disk recording medium and the slider material, the alumina buffering layer is easily deformed. Because of a larger area of contact with the disk recording medium involved during contact, coefficient of friction increases. Consequently, the slider tends to drag as the slider is in contact with a spinning disk recording medium. It is then likely that wear in the buffering layer will progress and the wear will increase the area of contact even further.

The present invention has been made in view of the problems in the prior art described above. It is therefore a feature of the present invention to provide a magnetic head slider capable of reducing damage to a disk recording medium when the slider flying above a disk recording medium inside a magnetic disk drive comes in contact with the disk recording medium due to slider vibration, and a disk drive mounted with such a magnetic head slider.

BRIEF SUMMARY OF THE INVENTION

An aspect of the present invention provides a magnetic head slider having a magnetic transducer for writing and reading data to/from a spinning disk. The magnetic head slider includes a damage preventive protective film having a smaller coefficient of friction than a slider base material and having a film thickness of about 10 nm or more. The damage preventive protective film is formed on a region including slider corner portions on a side of an air bearing surface and/or on a region including corner portions, on a side of a trailing end, of a rear pad on which the magnetic transducer is disposed.

According to the present invention, the damage preventive protective film having a smaller coefficient of friction than the slider base material is disposed on the region including the slider corner portions on the side of the air bearing surface and/or on the region including the corner portions, on the side of the trailing end, of the rear pad on which the magnetic transducer is disposed. These regions are likely to come into contact with the spinning disk. A friction force generated from a possible contact with the disk due to vibration or the like can be suppressed. Damage to the disk can thus be reduced.

A magnetic head slider according to another aspect of the present invention has a magnetic transducer for writing and reading data to and from a spinning disk. The magnetic head slider includes a damage preventive protective film having a higher hardness than a slider base material and having a film thickness of about 10 nm or more. The damage preventive protective film is formed on a region including slider corner portions on a side of an air bearing surface and/or on a region including corner portions, on a side of a trailing end, of a rear pad on which the magnetic transducer is disposed.

According to the present invention, the damage preventive protective film having a higher hardness than the slider base material is disposed on the region including the slider corner portions on the side of the air bearing surface and/or on the region including the corner portions, on the side of the trailing end, of the rear pad on which the magnetic transducer is disposed. These regions are likely to make contact with the spinning disk. Progress of wear occurring from a possible contact of the magnetic head slider with the disk due to vibration or the like can be suppressed. Damage to the disk can also be reduced by preventing the slider base material from directly coming into contact with the disk.

The magnetic head slider comprises: a front pad including a step bearing surface disposed on a surface of the base material on a side of a leading end and one or a plurality of leading side rail surfaces formed on the step bearing surface; and a rear pad including a rear step bearing surface disposed on the surface of the base material on a side of a trailing end and across the front pad and a negative pressure generating deep groove surface, and a trailing side rail surface formed on the rear step bearing surface. The leading side rail surface and the trailing side rail surface are formed on substantially the same level. The step bearing surface and the rear step bearing surface are formed with a predetermined depth D1 from the leading side rail surface and the trailing side rail surface. The damage preventive protective film has a film thickness equal to the predetermined depth D1 or less.

The magnetic head slider further comprises a leading pad disposed near vertices of the slider corner portions, on the side of the leading end, on the step bearing surface. The damage preventive protective film may be formed in a region including a top surface of the leading pad. The leading pad can further reduce friction force generated when the magnetic head slider comes into contact with the disk.

The magnetic head slider according to the present invention may include deep groove surfaces formed on both sides of the front pad to include the slider corner portions in a direction from the leading end toward the trailing end and to have a depth substantially the same as the negative pressure generating deep groove surface. The damage preventive protective film may be formed on a region including the deep groove surfaces on the slider corner portions. Forming the damage preventive protective film on the deep groove surfaces prevents the slider base material from directly coming into contact with the disk even when an entry angle of the magnetic head slider relative to the disk becomes large.

The damage preventive protective film may be formed continuously or intermittently along the leading end of the front pad. The damage preventive protective film thus reduces damage to the disk. The damage preventive protective film also narrows a gap between the air bearing surface of the magnetic head slider and the disk. The amount of dust and dirt entering this gap can therefore be reduced.

The step bearing surface may include a front step bearing surface and a side step bearing surface, and the side step bearing surface may be formed to extend up to a point near the trailing end. The damage preventive protective film may be formed on a region including the vertices of the slider corner portions and the trailing end of the side step bearing surface. This allows the damage preventive protective film to be formed to correspond to the shape of the air bearing surface that may vary according to the operating environment of the magnetic head slider or the like.

The damage preventive protective film may be formed as a hard protective film having a value of Vickers hardness of 3000 Hv or higher. Wear occurring from contact with the disk can thereby be inhibited.

The magnetic head slider may include a step surface formed on the leading side rail surface and having a predetermined height H from the leading side rail surface. The step surface may be formed continuously in a direction from the leading end toward the trailing end. The step surface provided on the leading side rail surface helps enhance a pressure boost effect achieved by an air stream entering the gap between the air bearing surface and the disk. Decrease in a flying height at high altitudes can then be reduced.

The damage preventive protective film may have a film thickness equal to the predetermined height H. This facilitates manufacturing for forming the step surface.

The damage preventive protective film and the step surface may be formed from a carbon film formed by the same step. The damage preventive protective film is thus formed using the carbon film formed by the same step and the step surface is formed in part of the leading side rail surface. Accordingly, the step surface can be formed at the same time when the damage preventive protective film is formed without involving an increased number of manufacturing man-hours.

A disk drive according to another aspect of the present invention includes a spinning disk; a magnetic head slider including a magnetic transducer for writing and reading data to and from the disk; a suspension for holding the magnetic head slider; an arm for supporting the suspension; and a driving portion for driving the arm. The magnetic head slider includes a damage preventive protective film having a smaller coefficient of friction than a slider base material and having a film thickness of about 10 nm or more. The damage preventive protective film is formed on a region including slider corner portions on a side of an air bearing surface and/or on a region including corner portions, on a side of a trailing end, of a rear pad on which the magnetic transducer is disposed.

The magnetic head slider mounted in the disk drive includes the damage preventive protective film having a smaller coefficient of friction so as not to generate a large friction force when the slider comes into contact with the disk. Accordingly, it is possible to provide a disk drive offering a high reliability against vibration or the like, since damage to the disk can be reduced, should there be contact with the disk.

According to the present invention, the magnetic head slider that flies above the disk recording medium inside the magnetic disk drive during operation includes the damage preventive protective film. The magnetic head slider therefore achieves an effect of reducing damage to the disk, should the slider contacts the disk.

BRIEF DESCRIPTION OF THE DRAWINGS

FIG. 11 is a cross sectional view taken along line XI-XI of FIG. 10.

FIG. 12 is a perspective view showing a magnetic head slider according to a third embodiment of the present invention.

DETAILED DESCRIPTION OF THE INVENTION

A specific embodiment to which the present invention is applied will be described below with reference to the accompanying drawings. The embodiment represents a hard disk drive (HDD) mounted with a magnetic head slider, to which the present invention is applied. The magnetic head slider is capable of reducing damage to a disk recording medium even when the slider comes in contact with the disk recording medium by including a protective layer formed thereon.

Figure 1:
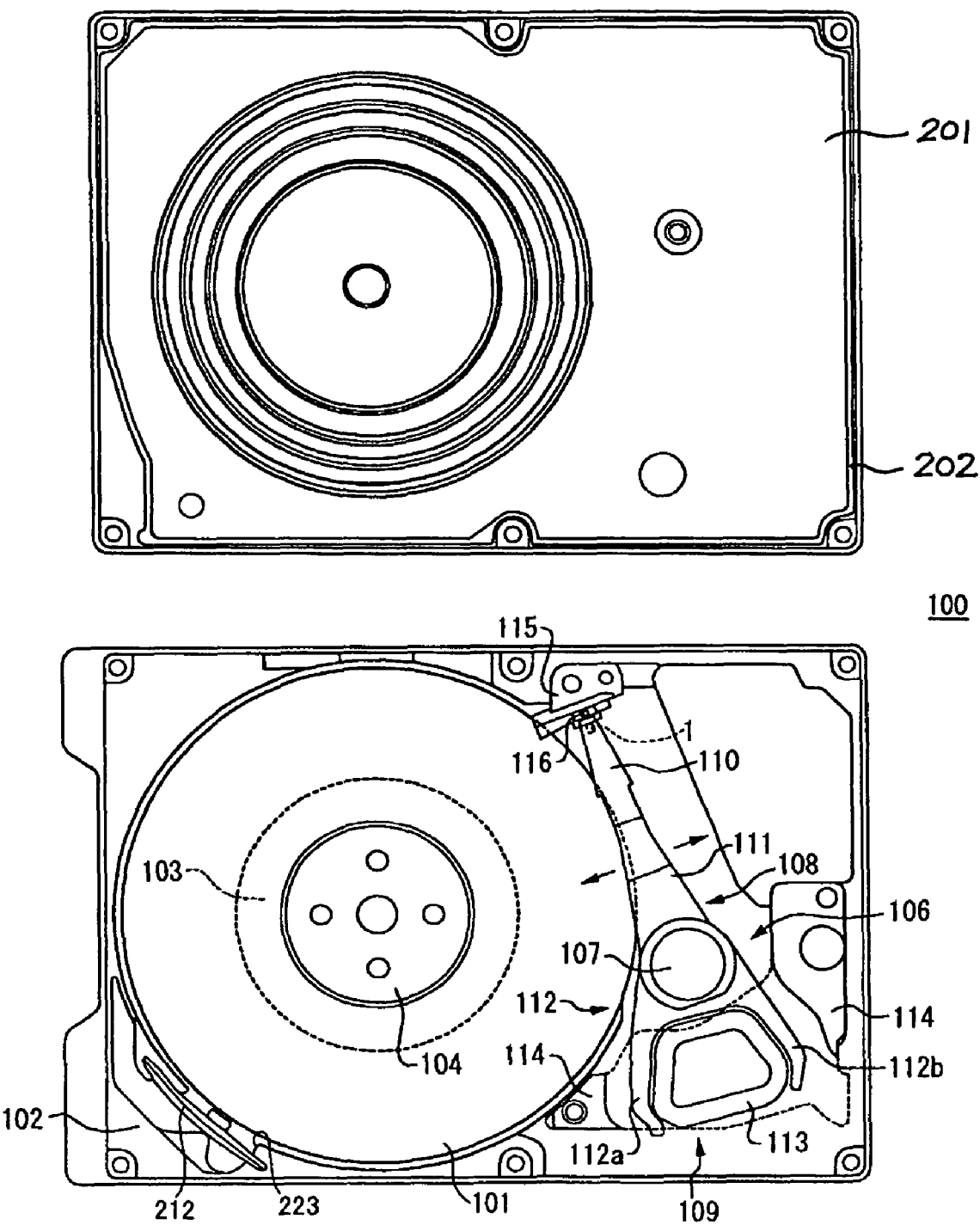
FIG. 1 is a plan view showing a hard disk drive according to an embodiment of the present invention.

A general construction of the HDD will be first described. The magnetic head slider capable of reducing damage to the disk recording medium will next be described. FIG. 1 is a plan view showing schematically a construction of an HDD 100 according to the preferred embodiment of the present invention. Referring to FIG. 1, reference numeral 101 represents a disk recording medium on which data is recorded. The disk recording medium 101 is a nonvolatile magnetic disk that stores data when a magnetic layer thereof is magnetized. Reference numeral 102 represents a base for accommodating components constituting the HDD 100. The base 102 is secured via a gasket 202 to a cover 201 for covering an upper portion opening thereof. The base 102 thereby constitutes a disk enclosure for accommodating the components of the HDD 100 in a totally closed state.

Reference numeral 103 represents a spindle motor. Reference numeral 104 represents a hub provided for the spindle motor 103. Reference numeral 1 represents a magnetic head slider. The magnetic head slider 1 includes a magnetic transducer (not shown) for writing and/or reading data transferred between a host (not shown) to/from the disk recording medium 101. The magnetic head slider 1 is a slider that includes the disk recording medium 101 and the magnetic transducer. The magnetic transducer includes a write element and/or a read element. The write element converts an electric signal to a corresponding magnetic field according to data stored in the disk recording medium 101. The read element converts a magnetic field from the disk recording medium 101 to a corresponding electric signal.

Reference numeral 106 represents an actuator for holding and moving the magnetic head slider 1. The actuator 106 is pivotally supported by an actuator shaft 107. The actuator 106 includes an actuator arm 108 and a VCM (voice coil motor) 109 as a driving mechanism. The actuator arm 108 includes a suspension 110, a head arm 111, and a coil support 112 connected in this order from a leading end portion of the actuator arm 108, at which the magnetic head slider 1 is disposed.

Reference numeral 113 represents a flat coil. Reference numeral 114 represents an upper stator magnet holding plate secured to the base 102. A principal portion of the upper stator magnet holding plate 114 is shown in a cut-away view for convenience sake, an outline thereof being shown by a broken line. Although not shown, a lower stator magnet holding plate is disposed on an underside of the flat coil 113. The lower stator magnet holding plate is disposed so as to sandwich the flat coil 113 between the upper stator magnet holding plate 114 and the lower stator magnet holding plate. The VCM 109 includes the flat coil 113, an upper stator magnet (not shown) secured to the upper stator magnet holding plate 114, and a lower stator magnet (not shown) secured to the lower stator magnet holding plate. Reference numeral 115 represents a ramp mechanism for allowing the magnetic head slider 1 to rest thereon from the disk recording medium 101 when the disk recording medium 101 is to be brought to a stop. Reference numeral 116 represents a tab formed on a leading end portion of the suspension 110. The actuator 106 according to a preferred embodiment may be applied to a CSS (Contact Start and Stop) system, in which the magnetic transducer of the magnetic head slider 1 is allowed to rest on a zone disposed on an inner periphery of the disk recording medium 101 when the magnetic transducer does not perform read/write operations of data.

The disk recording medium 101 is integrally held by the hub 104 of the spindle motor 103 secured to a bottom surface of the base 102. The disk recording medium 101 is rotatably driven by the spindle motor 103 at a speed, for example, of 10,000 rpm. The disk recording medium 101 remains stationary while the HDD 100 is not operating. The coil support 112 rotatably held by the actuator shaft 107 includes coil support arms 112a, 112b. The coil support arms 112a, 112b hold the flat coil 113 on a side opposite to the head arm 111 relative to the actuator shaft 107. The VCM 109 turns the actuator arm 108 about the actuator shaft 107 according to a driving signal fed through the flat coil 113 from a controller (not shown). The magnetic head slider 1 can thereby be moved to a location above, or out of, the disk recording medium 101.

To read/write data from/to the disk recording medium 101, the actuator 106 moves the magnetic head slider 1 to an aerial location above a surface of a spinning disk recording medium 101. Rotation of the actuator 106 moves the magnetic head slider 1 radially along the surface of the disk recording medium 101. This allows the magnetic head slider 1 to access a desired track. The magnetic head slider 1 flies above the disk recording medium 101 with a predetermined gap therefrom by the following. Specifically, a pressure by viscosity of air between an air bearing surface (hereinafter referred to as an ABS) of the slider opposing the spinning disk recording medium 101 balances a pressure applied by the suspension 110 in a direction of the disk recording medium 101.

When rotation of the disk recording medium 101 is stopped, the magnetic head slider 1 comes into contact with the surface of the disk recording medium 101. This presents such problems as scratches on a data region occurring from adsorption, the inability of the disk recording medium 101 to rotate, and the like. To eliminate the problems, the actuator 106 unloads the magnetic head slider 1 from the data region to the ramp mechanism 115 when the spinning disk recording medium 101 is to be brought to a stop. When the actuator 106 rotates toward the ramp mechanism 115, the tab 116 on the leading end portion of the actuator 106 moves, while sliding over the surface of the ramp mechanism 115, and rests on a parking surface on the ramp mechanism 115. This unloads the magnetic head slider 1. At the time of loading, the actuator 106 resting on the parking surface leaves the ramp mechanism 115 to move to an aerial location above the surface of the disk recording medium 101.

The disk recording medium 101 may be configured as a single unit or a plurality of units, or the medium 101 may be capable of one-sided or two-sided recording. If the disk recording medium 101 is capable of two-sided recording, a plural number of suspensions 110 corresponding to the number of recording surfaces should be provided. Each of the plurality of suspensions 110 supports a head for scanning each of the plurality of recording surfaces. For a single disk recording medium 101, a suspension 110 is secured to the coil support 112 via the head arm 111 at a position, at which the suspension 110 overlaps the other suspension 110 with predetermined intervals provided therebetween. For two-sided recording of a plurality of disk recording media 101, the plurality of disk recording media 101 are integrally held by the hub 104 with predetermined intervals provided in the direction of a rotational axis of the spindle motor 103. A plurality of suspensions for holding heads for scanning different recording surfaces are to be provided. The plurality of suspensions are then secured to the coil support 112 via the head arm 111 at a position, at which the suspensions overlap the other suspension 110 shown in FIG. 1 at predetermined intervals provided therebetween.

Figure 2:
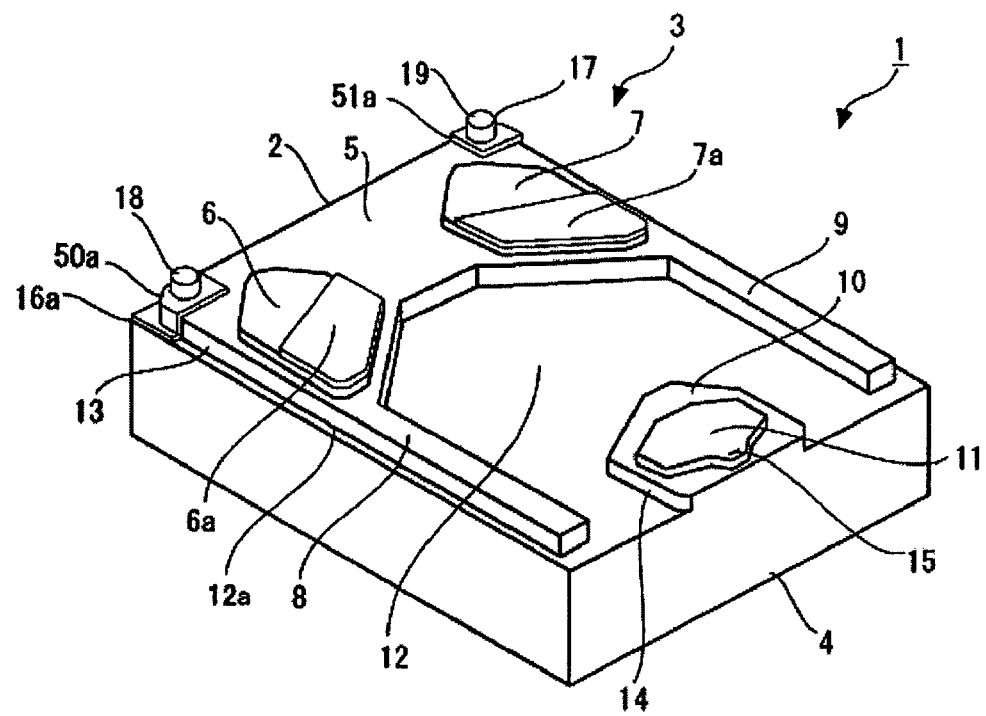
FIG. 2 is a perspective view showing a magnetic head slider according to a first embodiment of the present invention.
Figure 3:
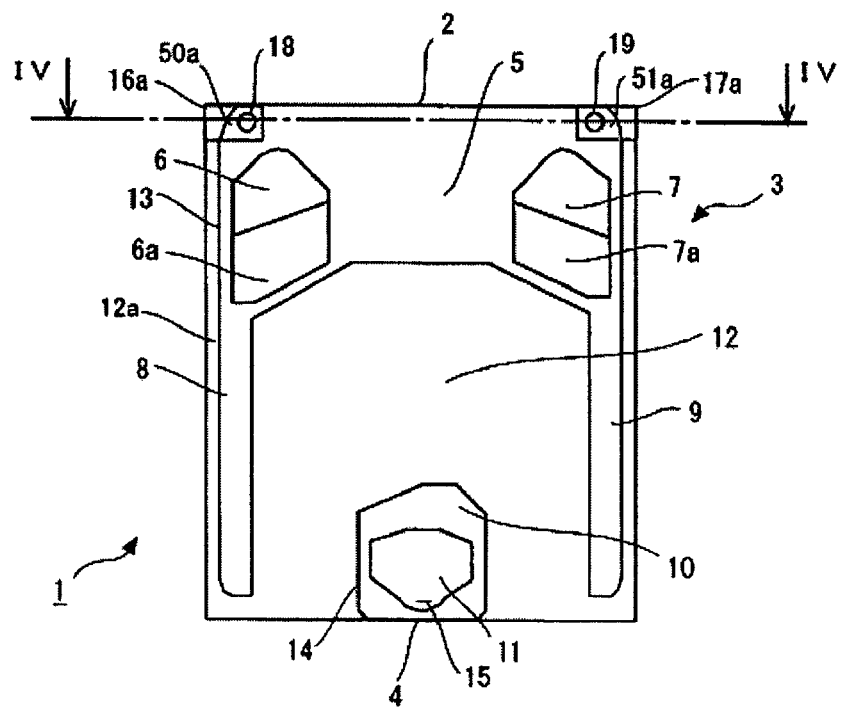
FIG. 3 is a plan view showing the magnetic head slider according to the first embodiment of the present invention.

The magnetic head slider according to a first embodiment of the present invention will be described in detail. FIGS. 2 and 3 are a perspective view and a plan view, respectively, showing the magnetic head slider according to the first embodiment. A magnetic head slider 1 according to the first embodiment of the present invention has a front pad 13 and a rear pad 14 formed on a surface of a base material. The magnetic head slider 1 also includes a leading end 2, an ABS 3 serving as a surface opposing the disk recording medium, and a trailing end 4.

The front pad 13 is disposed on the side of the leading end 2 on the surface of the base material. The front pad 13 includes a front step bearing surface 5 and leading side rail surfaces 6, 7 formed on the front step bearing surface 5. The rear pad 14 is provided on the side of the trailing end 4 on the surface of the base material. The rear pad 14 is disposed across a negative pressure generating deep groove surface (a deep groove surface) 12 from the front pad 13. The rear pad 14 includes a rear step bearing surface 10 and a trailing side rail surface 11 formed on the rear step bearing surface 10.

The front step bearing surface 5, the leading side rail surfaces 6, 7, the rear step bearing surface 10, the trailing side rail surface 11, and the deep groove surface 12 constitute the ABS 3. Specifically, the ABS 3 includes: the front step bearing surface 5 formed as a continuation from the leading end 2 of the front pad 13; the leading side rail surfaces 6, 7 formed on the right and left sides on the front step bearing surface 5; step surfaces 6a, 7a located on the leading side rail surfaces 6, 7 and having continuity in a longitudinal direction of the slider at a predetermined height H; side step bearing surfaces 8, 9 having the same depth as the front step bearing surface 5; the deep groove surface 12 surrounded by the front pad 13; the trailing side rail surface 11 of the rear pad 14; and the rear step bearing surface 10 formed to have the same depth as the front step bearing surface 5 and to surround the trailing side rail surface 11.

The leading side rail surfaces 6, 7 and the trailing side rail surface 11 are substantially on the same level. The surfaces 6, 7, and 11 act as what is called a positive pressure rail surface. The positive pressure rail surface generates pressure using an air stream flowing through a gap between the ABS 3 of the magnetic head slider 1 and the disk recording medium. The positive pressure rail surface thereby makes the magnetic head slider 1 fly above the disk medium. The front step bearing surface 5 and the rear step bearing surface 11 are in plane of substantially the same height. A depth D1 (see FIG. 4) from the leading side rail surfaces 6, 7 or the trailing side rail surface 11 is, for example, about 200 nm. The air stream flowing from the leading end 2 through the gap between the magnetic head slider 1 and the disk recording medium flows via the front step bearing surface 5 and the rear step bearing surface 10. The pressure of the air stream is then boosted by a step constituting the leading side rail surfaces 6, 7 and the trailing side rail surface 11. The air stream thereafter reaches the leading side rail surfaces 6, 7 and the trailing side rail surface 11.

The air stream that has reached the leading side rail surfaces 6, 7 further flows via a step to reach the step surfaces 6a, 7a. In the step surfaces 6a, 7a, the air stream generates a large pressure for making the magnetic head slider 1 fly. The step between the leading side rail surfaces 6, 7 and the step surfaces 6a, 7a is, for example, about 30 nm. To generate a large pressure in the step surfaces 6a, 7a, it is required that the step surfaces 6a, 7a be a continuation of some length extending in a leading direction of the air stream, that is, in the slider longitudinal direction. Forming the step surfaces 6a, 7a having such an extremely low profile allows a large lifting force to be generated.

The magnetic head slider according to the first embodiment of the present invention has the two leading side rail surfaces 6, 7 physically separated to right and left on the ABS 3. However, the leading side rail surfaces 6, 7 may be formed into a single continuation of the leading side rail surface. In the first embodiment of the present invention, a description is made of the leading side rail surfaces 6, 7 having thereon the step surfaces 6a, 7a, respectively, formed as continuations in the slider longitudinal direction. It is nonetheless appropriate that the magnetic head slider not have such step surfaces 6a, 7a. Providing the step surfaces 6a, 7a also helps stabilize the flying height of the magnetic head slider 1 under low-pressure conditions. This effect will be described in detail later.

The magnetic head slider 1 includes a magnetic transducer 15 for writing/reading information to/from the disk recording medium. The magnetic transducer 15 is provided on the trailing side rail surface 11 of the rear pad 14. The magnetic head slider 1 according to the first embodiment of the present invention also includes leading pads 18, 19. The leading pads 18, 19 are of the same height as the leading side rail surfaces 6, 7. The leading pads 18, 19 are respectively located at points near vertices of slider corners on the side of the leading end 2 on the side of the ABS 3. In addition, the magnetic head slider 1 is provided with deep grooves 12a on both ends in the slider longitudinal direction of the front pad 13. The deep grooves 12a are as deep as the deep groove surface 12. The deep grooves 12a are formed at the same time when the deep groove surface 12 is formed as part of machining the magnetic head slider 1. The machining method for the magnetic head slider 1 will be described later.

The leading pads 18, 19 have the same height as the leading side rail surfaces 6, 7 on the front step bearing surface 5 on the side of the leading end 2 of the slider and the trailing side rail surface 11. The leading pads 18, 19 may, for example, be island pads having a diameter of about 30 μm. For the first embodiment of the present invention, a description is made of a case in which the leading pads 18, 19 are provided on the side of the leading end 2. The leading pads 18, 19 may be formed on the side of the trailing end 4 of the front pad 13 or the rear pad 14. Forming the leading pads 18, 19 allows a friction force generated when the magnetic head slider 1 comes into contact with the disk recording medium to be reduced.

In the magnetic head slider according to the first embodiment, leading corner carbon protective films 50a, 51a are formed to serve as protective films (damage preventive protective films) formed from, for example, diamond-like carbon (DLC), which has a high hardness and a low coefficient of friction. The leading corner carbon protective films 50a, 51a are disposed in corner regions including top surfaces of the leading pads 18, 19 (leading pad surfaces) constituting the ABS 3 and corner portions (hereinafter referred to as leading side slider corner portions) 16a, 17a on both ends of the leading end 2.

As described in the foregoing, the leading side slider corner portions 16a, 17a form the deep grooves 12a. The leading corner carbon protective films 50a, 51a are formed to cover the following areas: specifically, from the deep grooves 12a including the leading side slider corner portions 16a, 17a on both ends on the side of the leading end 2 of the front step bearing surface 5 to a pad surface of the leading pad 18. According to the first embodiment of the present invention, the leading corner carbon protective films 50a, 51a are as thick as the step surfaces 6a, 7a.

Forming the leading corner carbon protective films 50a, 51a from the deep grooves 12a to the pad surfaces of the leading pads 18, 19 yields the following effect. Specifically, even when the magnetic head slider 1 vibrates to come into contact with the disk recording medium, the low coefficient of friction does not produce a large friction force. Accordingly, damage to the disk recording medium is reduced. In other words, if the magnetic head slider 1 vibrates largely to come into contact with the disk recording medium at a large entry angle, contact with the disk recording medium occurs at the leading side slider corner portions 16a, 17a of the slider. According to the first embodiment of the present invention, however, the leading corner carbon protective films 50a, 51a are formed also on the deep grooves 12a including the leading side slider corner portions 16a, 17a. Consequently, there is no possibility that the slider base material comes into contact with the disk recording medium, thus, reducing damage to the disk recording medium.

For the first embodiment of the present invention, an exemplary case where the leading pads 18, 19 are formed is described. If the leading pads 18, 19 are not provided, the leading corner carbon protective films 50a, 51a may be formed in regions including the leading side slider corner portions 16a, 17a and the corner portions of the front pad 13. Damage to the disk recording medium occurring from contact with the magnetic head slider 1 can be reduced by forming the leading corner carbon protective films 50a, 51a on positions, at which contact between the magnetic head slider 1 and the disk recording medium is likely to occur. These positions may be selected as possible candidates for portions to be formed with the leading corner carbon protective films 50a, 51a, in addition to the leading side slider corner portions 16a, 17a, according to a design method of the ABS, an application of the HDD, and the like, as will be described later.

Figure 4:
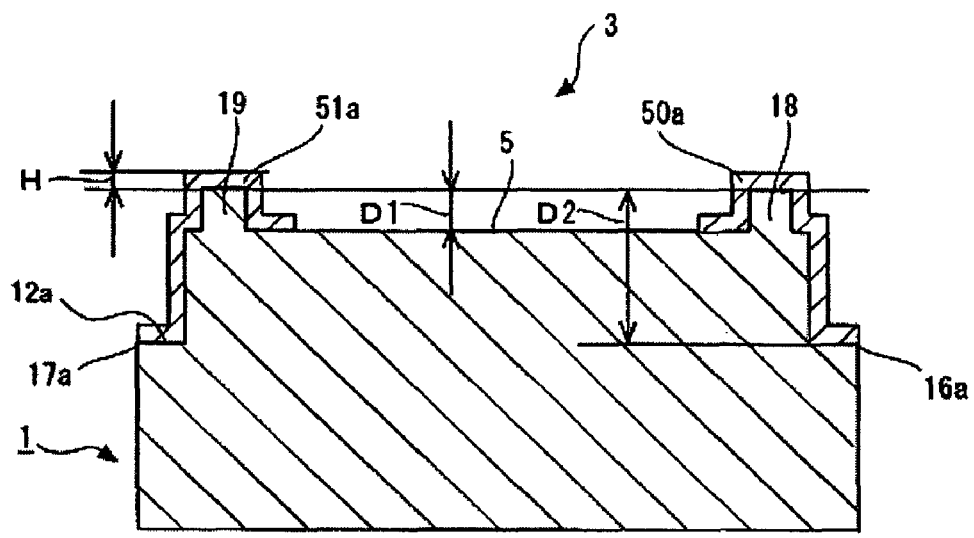
FIG. 4 is a cross sectional view taken along line IV-IV of FIG. 3.

FIG. 4 is a cross-sectional view taken along line IV-IV of FIG. 3. FIG. 4 is an explanatory view showing schematically relative relations among the leading corner carbon protective films 50a, 51a, the leading pads 18, 19, the leading side slider corner portions 16a, 17a, the front step bearing surface 5, and the deep groove surface 12. Specific dimensions of the magnetic head slider 1 may be given, for example, as below. Specifically, the magnetic head slider 1 may be 1.25 mm long, 1.0 mm wide, and 0.3 mm thick. A height H of the step surfaces 6a, 7a relative to the leading side rail surfaces 6, 7 and the trailing side rail surface 11 is the same as the height of the leading corner carbon protective films 50a, 51a, typically, for example, 30 nm. The depth D1 of the front step bearing surface 5 and the side step bearing surfaces 8, 9 relative to the leading side rail surfaces 6, 7 and the trailing side rail surface 11 is, for example, about 200 nm. A depth D2 of the deep groove surface 12 is, for example, 1.5 μm.

As is shown from FIG. 4, in the magnetic head slider 1 according to the first embodiment, the leading corner carbon protective films 50a and 51a completely cover the leading side slider corner portions 16a and 17a, respectively. The leading corner carbon protective films 50a, 51a may be formed as below. Specifically, typical forming methods include, for example, a deposition method by sputtering, and ion milling or etching such as RIE or the like applied to a carbon protective film formed in advance on a front surface of the ABS. The step surfaces 6a, 7a formed on the leading side rail surfaces 6, 7, on the other hand, can be formed through the same method. Specifically, as in the first embodiment of the present invention, the step surfaces 6a, 7a and the leading corner carbon protective films 50a, 51a can be simultaneously formed using the same process. If the step surfaces 6a, 7a are to be provided, the leading corner carbon protective films 50a, 51a having the same film thickness as the step surfaces 6a, 7a can be formed at the same time. When the leading corner carbon protective films 50a, 51a are to be formed, the step surfaces 6a, 7a of the same film thickness can be formed simultaneously. This reduces the number of man-hours and cost required for manufacturing.

The leading corner carbon protective films 50a, 51a and the step surfaces 6a, 7a may be formed through different processes so that the film thickness of the leading corner carbon protective films 50a, 51a differs from the step height of the step surfaces 6a, 7a. Different processes may also be employed so that different materials are used between the leading corner carbon protective films 50a, 51a and the step surfaces 6a, 7a. It is only required that the leading corner carbon protective films 50a, 51a be formed on at least the front step bearing surface 5 including the corner portions of the leading pads 18, 19 on the side of the ABS or leading end 2, and the bottom surface of the deep grooves 12a including the leading side slider corner portions 16a, 17a. The same effect can be achieved even if, for example, sidewalls of the leading pads 18, 19 are not coated.

The operation of the HDD 100 according to the first embodiment of the present invention and the effect of the first embodiment achieved by providing the leading corner carbon protective films 50a, 51a will be described in detail with reference to FIGS. 5 through 8.

Figure 5:
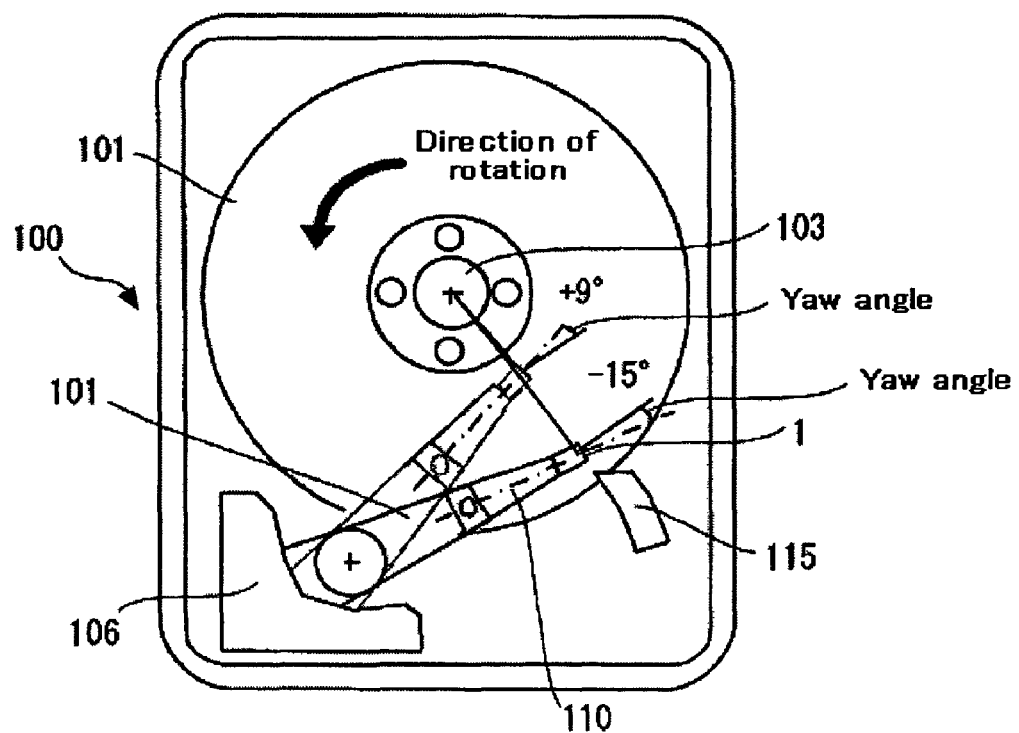
FIG. 5 is a plan view for explaining a yaw angle of a magnetic disk drive mounted with a magnetic head slider.
Figure 6:
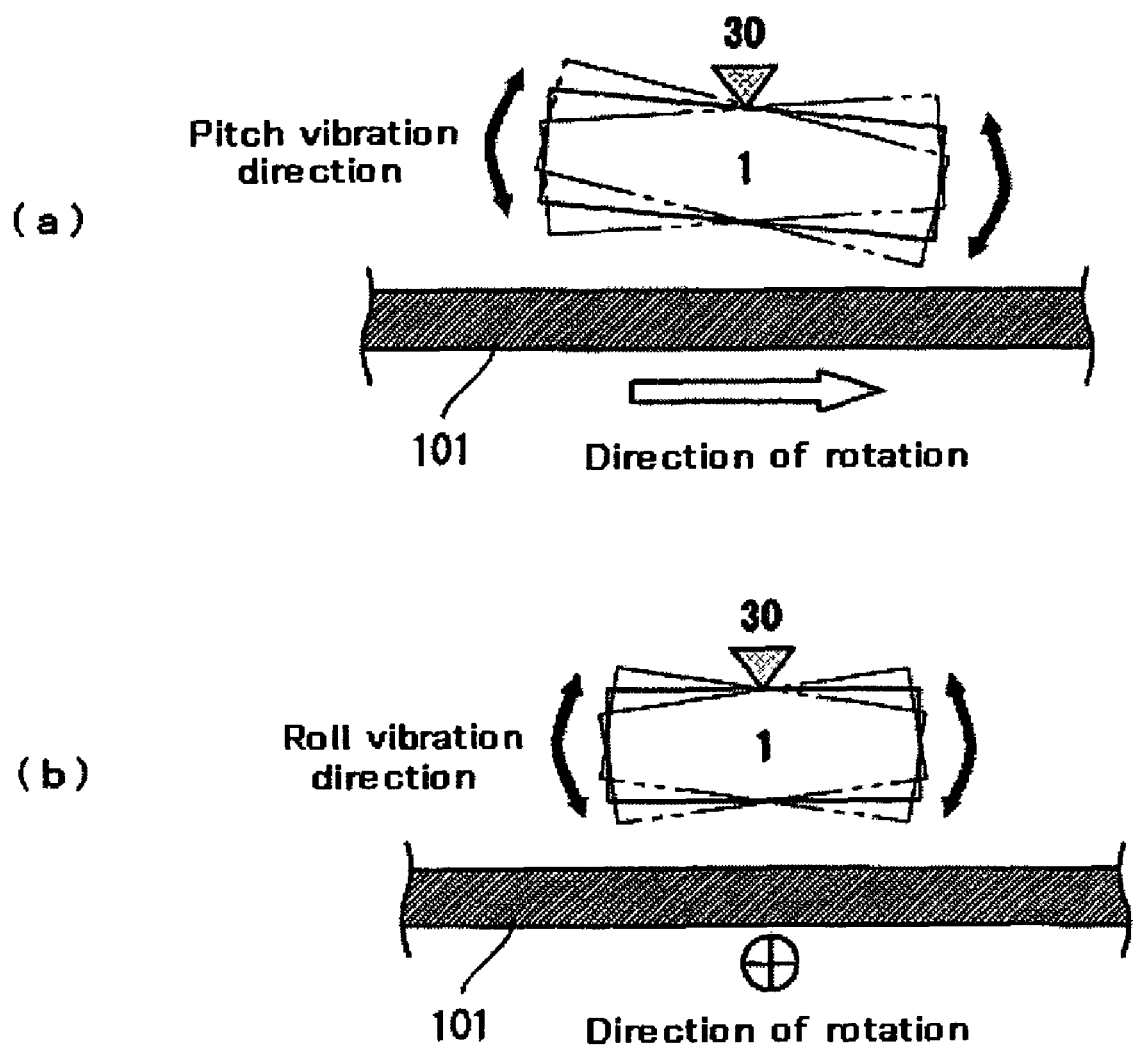
FIG. 6(a) is a view for explaining vibration of a slider in a pitch direction.
FIG. 6(b) is a view for explaining vibration of a slider in a roll direction.
Figure 7:
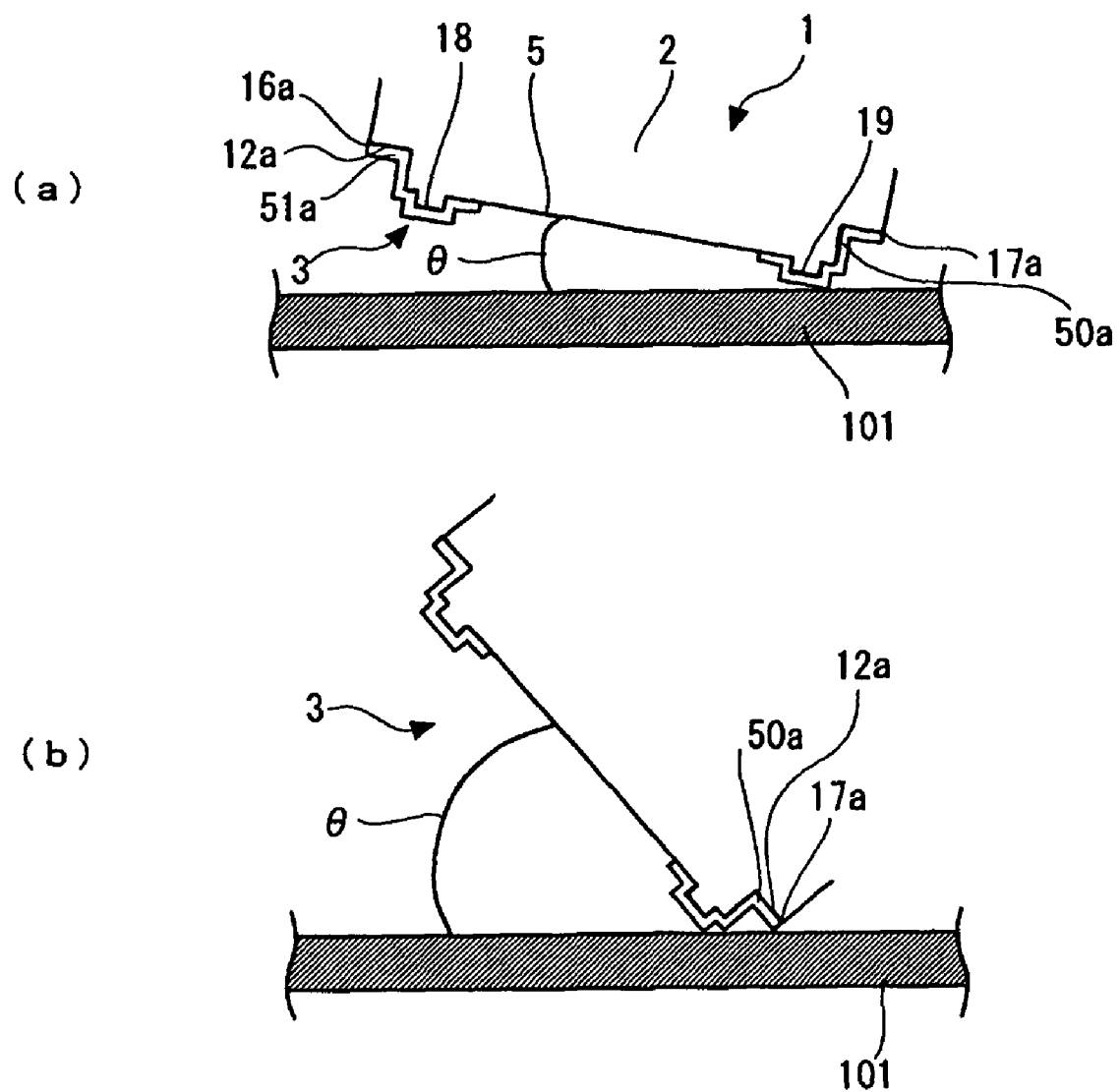
FIG. 7(a) is a view for explaining a condition, in which an angle formed by a slider entering a disk recording medium is small.
FIG. 7(b) is a view for explaining a condition, in which the angle formed by the slider entering the disk recording medium is large.
Figure 8:
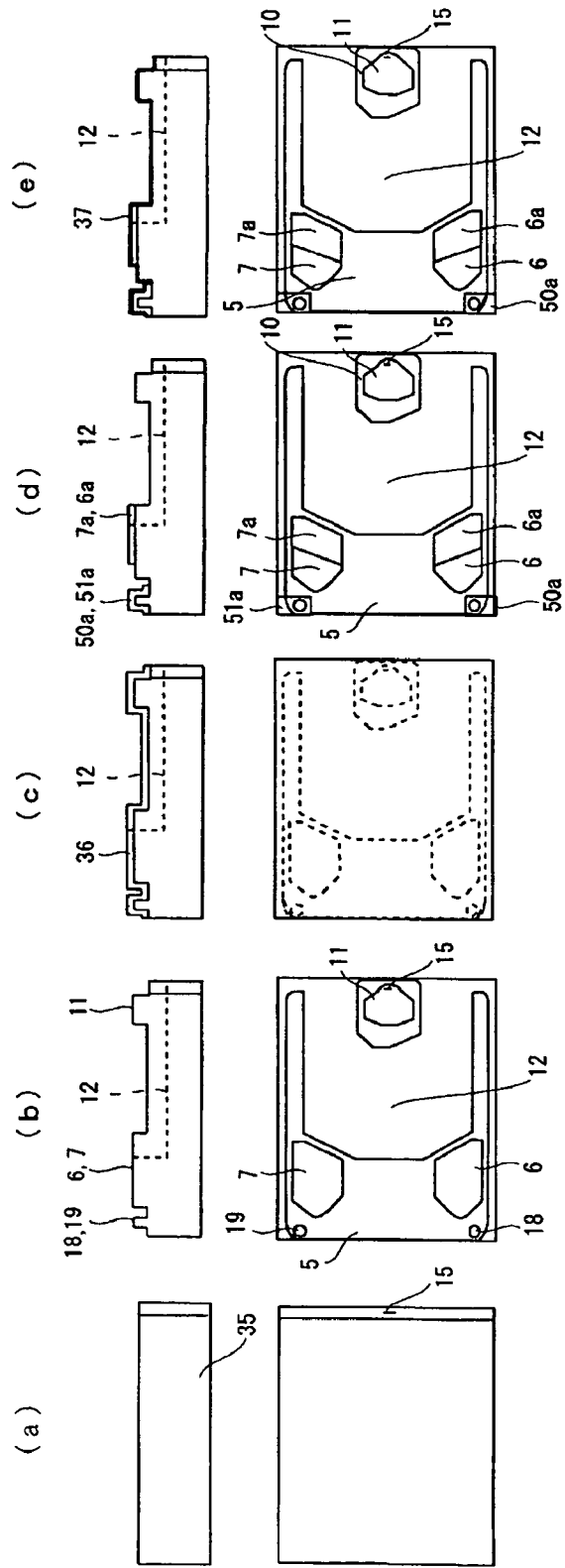
FIGS. 8(a) through 8(e) are views showing, in correct sequence, steps for manufacturing the magnetic head slider according to the first embodiment of the present invention.

FIG. 5 is a schematic view showing the HDD 100 mounted with the magnetic head slider according to the embodiment of the present invention. Like parts as those shown in FIG. 1 are identified by the same reference numerals and detailed descriptions for the same will be omitted. The HDD 100 can be mounted, for example, with the disk recording medium 101 having a diameter of 84 mm involving variations in a yaw angle from substantially +9° through −15°. The yaw angle as the term herein used means an angle formed by the magnetic head slider 1 between a direction along which air flows in the slider 1 along a circumference of the disk recording medium 101 by a pivotal motion effected by the pivot actuator 106 and the longitudinal direction of the slider 1 when the slider 1 is positioned in opposition to the disk recording medium 101. The yaw angle is positive in direction in which air flows in from an inner peripheral side of the disk recording medium 101 relative to the longitudinal direction of the magnetic head slider 1.

The magnetic head slider 1 is pushed with a force of 2.0 gf by the suspension 110 onto the disk recording medium 101 mounted in the spindle motor 103 rotating at, for example, 10,000 rpm. At that time, an air stream generated by rotation of the disk recording medium 101 enters the gap between the magnetic head slider 1 and the disk recording medium 101. This causes the magnetic head slider 1 to fly above the disk recording medium 101. The pivot actuator 106 accurately positions the magnetic head slider 1 at an arbitrary radius position that ranges between substantially 19 through 39 mm on the disk recording medium 101. The magnetic transducer 15 mounted on the trailing side rail surface 11 on the rear pad 14 of the magnetic head slider 1 allows the magnetic head slider 1 to read/write information from/to the disk recording medium 101 at any arbitrary position thereon. The description has herein been made with reference to an exemplary case of a 3.5-inch disk drive as an example of the HDD. The same effect can be achieved also with a magnetic disk drive having a smaller diameter than the exemplary case.

In the HDD 100, the magnetic head slider 1 flying above the disk recording medium 101 generally flies stably without coming into contact with the disk recording medium 101. The magnetic head slider 1 can nonetheless be vibrated due to disturbance vibration applied to the HDD 100 or dust and dirt subsequently generated inside the HDD 100 colliding with the magnetic head slider 1.

Referring to FIGS. 6(a) and 6(b), vibration of the magnetic head slider 1 occurs in a condition, in which vibration in the slider longitudinal direction (pitch vibration) is combined with vibration in the slider crosswise direction (roll vibration) relative to a pivot 30 of the suspension 110 supporting the magnetic head slider 1. While the amplitude of vibration remains small, the magnetic head slider 1 does not come into contact with the disk recording medium 101 and the vibration dampens to restore the magnetic head slider 1 to an original stable flying state. When the amplitude of vibration is large, however, the magnetic head slider 1 is liable to come into contact with the disk recording medium 101. If a contact occurs, the amplitude of the pitch or roll vibration of the magnetic head slider 1 is amplified, resulting in any of the slider corner portions of the magnetic head slider 1 coming into contact with the disk recording medium 101.

In recent years, surface roughness of the disk recording medium 101 used for lower flying height is extremely small and the disk recording medium 101 has a surface of high coefficient of friction. Accordingly, even the slightest contact can cause the disk recording medium 101 to drag the magnetic head slider 1. There is therefore a stronger likelihood of scratch damage occurring on the disk recording medium 101.

In the magnetic head slider 1 according to the first embodiment of the present invention, the leading corner carbon protective films 50a, 51a having a sufficient hardness and strength are formed on portions having the greatest likelihood of contact during slider vibration. The portions are, according to the first embodiment of the present invention, regions of corner portions including the leading side slider corner portions 16a, 17a. This prevents direct contact between the magnetic head slider 1 and the disk recording medium 101. Damage to the disk recording medium 101 can thus be reduced.

Effects of the leading corner carbon protective films 50a, 51a will next be described based on a comparison made between a conventional magnetic head slider having no leading corner carbon protective films 50a, 51a and the magnetic head slider 1 according to the first embodiment of the present invention. Assume that the entry angle of the magnetic head slider 1 relative to the disk recording medium 101 is θ. FIGS. 7(a) and 7(b) are schematic views showing conditions of how the magnetic head slider 1 comes into contact with the disk recording medium 101 according to the first embodiment of the present invention. FIG. 7(a) shows a state where the entry angle θ is small (a small entry angle). FIG. 7(b) shows a state where the entry angle θ is large (a large entry angle).

As the entry angle θ of the magnetic head slider 1 relative to the disk recording medium 101 increases, the point of contact of the magnetic head slider 1 changes as follows: specifically, referring to FIGS. 7(a) and 7(b), from the top surface of the leading pads 18, 19 to the corner portion of the step bearing surface 5 and to the corner portion of the deep grooves 12a. The conventional magnetic head slider 1 does not have the leading corner carbon protective films 50a, 51a. Consequently, a large difference is produced in the friction force generated upon contact between the conventional magnetic head slider and the magnetic head slider 1 according to the first embodiment of the present invention. Such a large difference is produced from the changes in the point of contact as they are made with the increase in the entry angle θ upon the contact.

Specifically, in the magnetic head slider 1 formed with the leading corner carbon protective films 50a, 51a according to the first embodiment, the contact is made invariably between the carbon protective films and the disk recording medium 101 regardless of the entry angle θ. With the conventional magnetic head slider having no leading corner carbon protective films 50a, 51a, on the other hand, the point of contact with the disk recording medium 101 changes as described above.

The carbon protective film according to the first embodiment of the present invention may, for example, be formed from DLC. Vickers hardness Hv of the DLC can range from about 3000 to 5000. The base material of the slider is made of a type of ceramics called AlTiC (a sintered body of $Al_2O_3$+ TiC). Vickers hardness Hv of AlTiC is about 2000 and AlTiC is thus softer than the carbon protective film.

The coefficient of friction μ of the leading corner carbon protective films 50a, 51a is about 0.1 to 0.2, whereas the coefficient of friction μ of AlTiC is about 0.3 to 0.6. In addition, the surface roughness (Ra) of the leading side rail surfaces 6, 7 on the ABS is less than 5 nm, the surface roughness (Ra) of the step bearing surfaces 5, 10 is 5 to 10 nm, and the coefficient of friction μ of the deep groove surface 12 and the deep grooves 12a is 10 to 30 nm.

In the conventional magnetic head slider, slider materials of the step bearing surface 5 and the deep groove surface 12 are exposed. In some cases, a carbon protective film of as thin as about 5 nm may be formed. Under a condition in which a local contact force increases with a large entry angle θ, however, wear in such a thin carbon protective film quickly progresses, causing the slider material to be eventually exposed. As described earlier, the coefficient of friction of DLC is about one third of that of AlTiC. If the slider is exposed or has been exposed, therefore, the coefficient of friction increases threefold or more of that of the carbon protective film all at once. Then, the sudden increase in friction force causes the disk recording medium to drag the magnetic head slider. This damages the disk recording medium.

In the magnetic head slider 1 according to the first embodiment, on the other hand, the carbon protective film can be prevented from wearing rapidly regardless of how much the entry angle is. In other words, the rapid wear of the carbon protective film can be prevented regardless of whether the disk recording medium 10 comes into contact with the leading pads 18, 19, the front step bearing surface 5, or the deep grooves 12a. This prevention can be achieved by forming as the leading corner carbon protective film 50a, 51a the carbon protective film with a film thickness that overcomes the roughness of each of the surfaces of the leading pads 18, 19, the front step bearing surface 5, and the deep grooves 12a. This eliminates the likelihood that the slider material having a large coefficient of friction will make a direct contact with the disk recording medium 101. Accordingly, the increase in the friction force is small and the disk recording medium 101 cannot be damaged.

In the magnetic head slider 1 according to the first embodiment, portions that are likely to come in contact with the disk recording medium are covered with the leading corner carbon protective films 50a, 51a having a sufficient thickness of 10 nm or more, for example 30 nm, and a sufficient hardness. Through this arrangement, the leading corner carbon protective films 50a, 51a can retain a relatively low coefficient of friction at all times regardless of whether the point of contact changes from the leading pads 18, 19 to the front step bearing surface 5 and to the corner portions of the deep grooves 12a. Accordingly, the friction force will not increase regardless of how much the entry angle θ is. The disk recording medium 101 will not then drag the magnetic head slider 1. Scratch damage can therefore be reduced drastically.

According to the first embodiment of the present invention, the step surfaces 6a, 7a, if ones are to be formed, can be formed through the same process as that used for forming the leading corner carbon protective films 50a, 51a. A description of the step surfaces 6a, 7a will be given in detail later. A machining method for the magnetic head slider 1 according to the first embodiment of the present invention will next be described. FIGS. 8(a) through 8(e) are views showing, in correct sequence, steps for manufacturing the magnetic head slider 1 according to the first embodiment of the present invention. In each of FIGS. 8(a) through 8(e), the upper illustration is a side elevational view showing the magnetic head slider 1 and the lower illustration is a plan view showing the magnetic head slider 1.

First of all, a ceramic wafer, on which the magnetic transducer 15 is formed entirely, is sliced into row bars including a plurality of elements. The sliced surfaces ate then accurately and evenly polished. At this time, an element height (MR height) determining electromagnetic characteristics of the magnetic head slider is simultaneously adjusted for all elements.

The obtained polished surface is then machined to the shape of the ABS 3 as described above. First, an AlTiC row bar 35 as the base material of the slider is processed using the same method as that for machining ordinary sliders. A machining method, for example ion milling, is herein used to form the leading pads 18, 19, the leading side rail surfaces 6, 7, the trailing side rail surface 11, the front step bearing surfaces 5, 9, 10, and the deep groove to serve as the deep groove surface 12, and the like. Surfaces are then machined to achieve, for example, a surface roughness (flatness) (Ra) of less than 5 nm for the rail surfaces 6a, 7a, 11 and a surface roughness (flatness) (Ra) of about 5 to 10 nm for the step bearing surfaces 5, 8, 9, 10 (FIGS. 8(a) and 8(b)). Next, a first silicone layer (not shown) is formed on the entire surface of the row bar 35 and then a first DLC layer 36 is formed. Here, the sum of a thickness of the silicone layer and the thickness of the DLC layer 36 becomes the film thickness of the leading corner carbon protective films 50a, 51a and the step height of the step surfaces 6a, 7a. Accordingly, the film thickness of the DLC layer 36 should be 10 nm or more in consideration of durability of the leading corner carbon protective films 50a, 51a and the like. It is preferable that the film thickness range between 5 and 50 nm in order to stabilize the flying height with the step height of the step surfaces 6a, 7a. An optimum thickness should be provided in consideration of these factors, therefore, when the leading corner carbon protective films 50a, 51a and the step surfaces 6a, 7a are to be formed simultaneously (FIG. 8(c)).

The portions corresponding to the leading corner carbon protective films 50a, 51a and the step surfaces 6a, 7a are thereafter masked, and the DLC layer 36 and the first silicone layer on other portions are removed (FIG. 8(d)).

The row bar is finally diced into each chip (magnetic head slider). To protect the ABS 3, the entire surface of the ABS 3 is coated with a second silicone layer (not shown) and a second DLC layer 37 (FIG. 8(e)).

The magnetic head slider thus manufactured is mounted in a gimbal portion of the suspension so as to have three degrees of freedom, thereby serving as an HGA (head gimbal assembly). The HGA is then assembled to the HDD 1.

According to the first embodiment, the leading corner carbon protective films 50a, 51a and the step surfaces 6a, 7a are formed from the silicone layer and the DLC layer 36 that have been formed first. It is nonetheless perfectly appropriate that the leading corner carbon protective films 50a, 51a and the step surfaces 6a, 7a be formed by depositing silicone and DLC after the second silicone layer and the second DLC layer 37 shown in FIG. 8(e) have been formed.

According to the first embodiment of the present invention, the leading corner carbon protective films 50a, 51a are provided near the slider corner portion of the leading end 2. The films 50a, 51a are harder than the slider base material, has a smaller coefficient of friction than the slider base material, and has a film thickness of 10 nm or more. This arrangement prevents the leading corner carbon protective films 50a, 51a from being worn by contact thereof with the disk recording medium 101. The arrangement also prevents the slider base material having a large coefficient of friction from making direct contact with the disk recording medium 101. Damage to the disk recording medium 101 can thereby be reduced. It should herein be noted that a carbon film, generally DLC or the like, is formed as a protective film on the surface of the disk recording medium 101 for prevention of damage thereto. The leading corner carbon protective films 50a, 51a are required to be harder than the slider base material so as to be prevented from being worn by contact thereof with the disk recording medium 101. It is nonetheless preferable that the hardness of the leading corner carbon protective films 50a, 51a be equal to, or lower than, the hardness of the protective film formed on the disk recording medium 101 so that the leading corner carbon protective films 50a, 51a do not damage the disk recording medium 101.

These arrangements achieve the following effect. Specifically, assume that an external impact or the like causes the magnetic head slider 1 jump and tilt largely to hit against the disk recording medium 101. In such a condition, the collision can be made at the leading corner carbon protective films 50a, 51a, on which the film is thick enough, instead of the cut or milled surface of the magnetic head slider 1 where the base material is generally exposed, or a portion coated only with a thin protective film.

According to the prior art disclosed in Patent Document 1, damage to the disk recording medium caused by the contact between the magnetic head slider and the disk recording medium is prevented by providing the alumina buffering layer that is softer than the slider base material. Vickers hardness Hv of the alumina is about 1600. Coefficient of friction μ of the alumina, a type of ceramics like the base material, is about 0.3. With such a soft alumina buffering layer having such a high coefficient of friction, however, the area of contact upon contact becomes relatively larger than with the carbon protective film. This leads to an increase in the friction force. The disk recording medium also tends to drag the magnetic head slider. As a result, wear of the alumina buffering layer rapidly progresses and dust and dirt produced from wear cause a head crash. The wear further enlarges the area of contact, resulting in the disk recording medium being damaged.

The leading corner carbon protective films 50a, 51a according to the first embodiment, on the other hand, are formed from DLC or the like having a thickness of 10 nm or more. The carbon protective films 50a, 51a are resistant to wear, produce less dust and dirt, and have a low coefficient of friction. Scratch damage and the like on the disk recording medium occurring from contact between the magnetic head slider 1 and the disk recording medium 101 can therefore be inhibited. Film thickness of the damage preventive film such as the leading corner carbon protective films 50a, 51a embodied in the present invention can be appropriately set to a value of 10 nm or more in consideration of durability and the like. For example, a film thickness value set to be greater than the depth D1 of the front step bearing surface 5 from the leading side rail surface 7 inhibits entry of air from the leading end 2, thus inhibiting generation of a lifting force by the rail surface. Preferably, the film thickness should therefore be set to a value of the depth D1 or less. If the carbon protective films 50a, 51a are to be formed simultaneously with the DLC film formed through the same process for forming the step surfaces 6a, 7a, it is necessary to determine the film thickness in consideration also of the height of the step surfaces 6a, 7a.

According to the first embodiment, the magnetic head slider 1 includes not only the leading pads 18, 19, but also the leading corner carbon protective films 50a, 51a formed on the corner portions of the front step bearing surface 5 and on the deep grooves 12a on both sides of the front pad 13. Due to this arrangement, the disk recording medium 101 comes into contact with the leading corner carbon protective films 50a, 51a, not only when the entry angle θ of the magnetic head slider 1 relative to the disk recording medium 101 is small, but also when it is large. Damage to the disk recording medium 101 can be reduced as described above.

When the step surfaces 6a, 7a are provided on the leading side rail surfaces 6, 7 for improving flying characteristics under reduced pressure conditions or the like, the step surfaces 6a, 7a can be formed with the same process as that for forming the leading corner carbon protective films 50a, 51a. Accordingly, the magnetic head slider 1 offering both outstanding flying characteristics and high reliability can be provided without involving an increased manufacturing cost.

Figure 9:
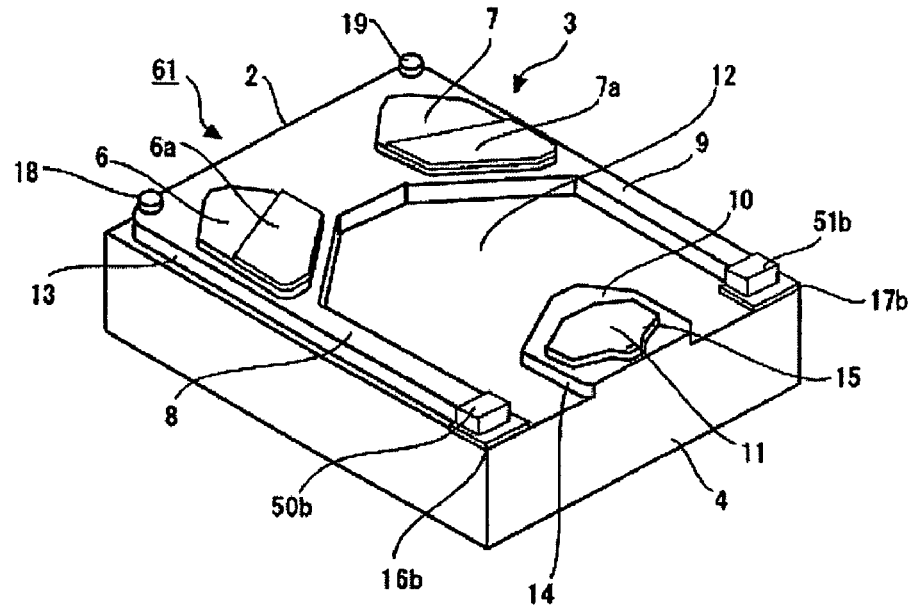
FIG. 9 is a perspective view showing a magnetic head slider according to a second embodiment of the present invention.
Figure 10:
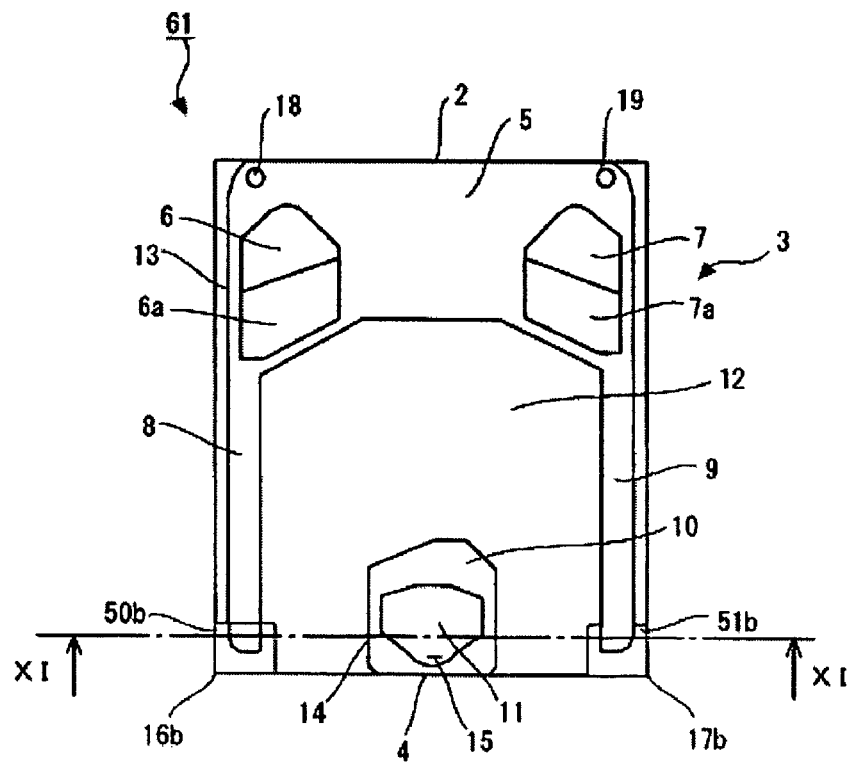
FIG. 10 is a plan view showing the magnetic head slider according to the second embodiment of the present invention.
Figure 1:
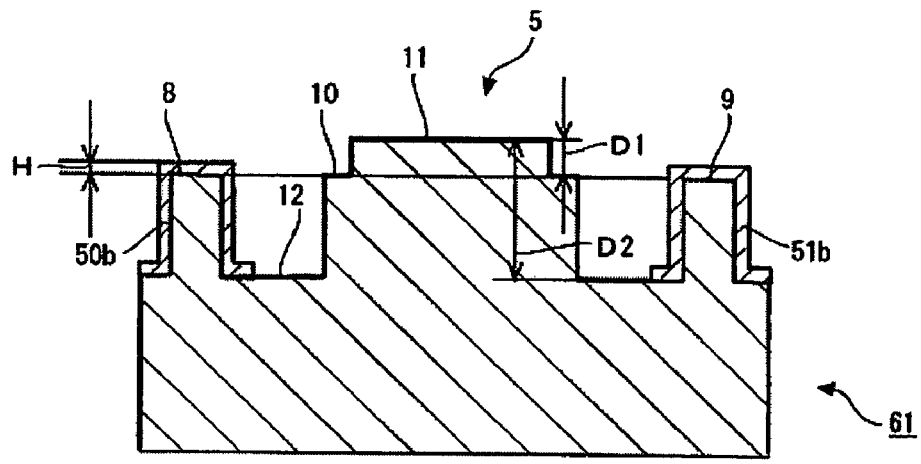
Figure 1:
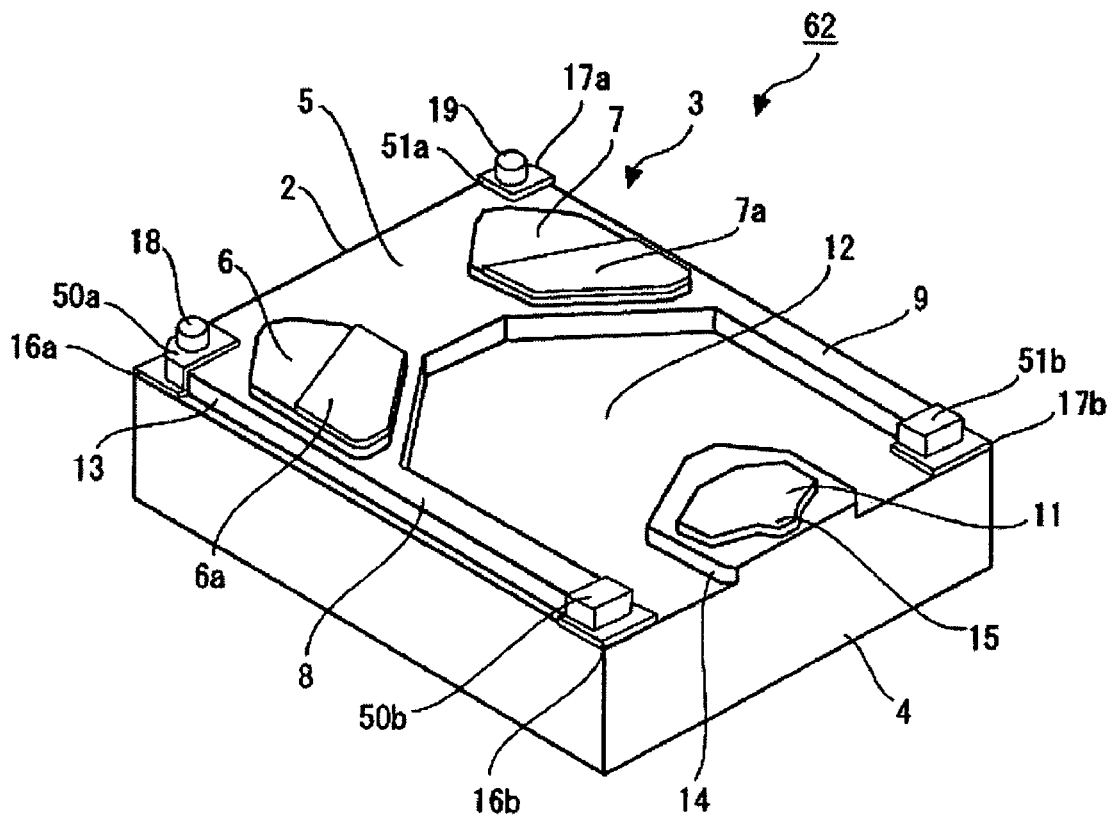

A magnetic head slider according to a second embodiment of the present invention will be described. FIG. 9 is a perspective view showing the magnetic head slider according to the second embodiment. FIG. 10 is a plan view and FIG. 11 is a cross-sectional view taken along line XI-XI of FIG. 10. In the second embodiment, and in third to seventh embodiments of the present invention to be described later, like parts as those used in the first embodiment shown in FIGS. 2 through 4 are identified by the same reference numerals and detailed descriptions for the same will be omitted.

A magnetic head slider 61 according to the second embodiment of the present invention differs from the magnetic head slider 1 according to the first embodiment in positions at which the carbon protective films are formed. Specifically, in the magnetic head slider 61 according to the second embodiment, carbon protective films (hereinafter referred to as the trailing corner carbon protective films) 50b, 51b are formed in regions including portions of side step bearing surfaces 9, respectively, on the side of the trailing end 4 and including slider corner portions (hereinafter referred to as the trailing side slider corner portions) 16b, 17b, respectively, on the side of the trailing end 4. The other structural configurations are the same as those of the magnetic head slider 1 according to the first embodiment of the present invention.

The magnetic head slider 1 according to the first embodiment of the present invention achieves a damage reduction effect of the disk recording medium 101 for contact vibration on the side of the leading end 2; while on the other hand, the magnetic head slider 61 according to the second embodiment is intended to reduce damage from contact on the side of the trailing end 4. These trailing corner carbon protective films 50b, 51b are particularly effective for the magnetic head slider 61 having a rear pad 14 at substantially a center in the crosswise direction of the slider on the side of the trailing end 4. Since rails are disposed so as to result in relatively weak stiffness in the roll direction in the magnetic head slider 61 as embodied as described above, the magnetic head slider 61 develops relatively larger vibration in the roll direction than on the side of the leading end 2. Accordingly, the trailing corner carbon protective films 50b, 51b are effective in reducing damage caused by slider vibration arising from vibration in the roll as well as pitch direction.

In the second embodiment, step surfaces 6a, 7a may be formed simultaneously with the trailing corner carbon protective films 50b, 51b as described above as well. This allows the magnetic head slider 61 ensuring a stabilized flying height even under low pressure conditions without involving an increase in the manufacturing cost.

Figure 13:
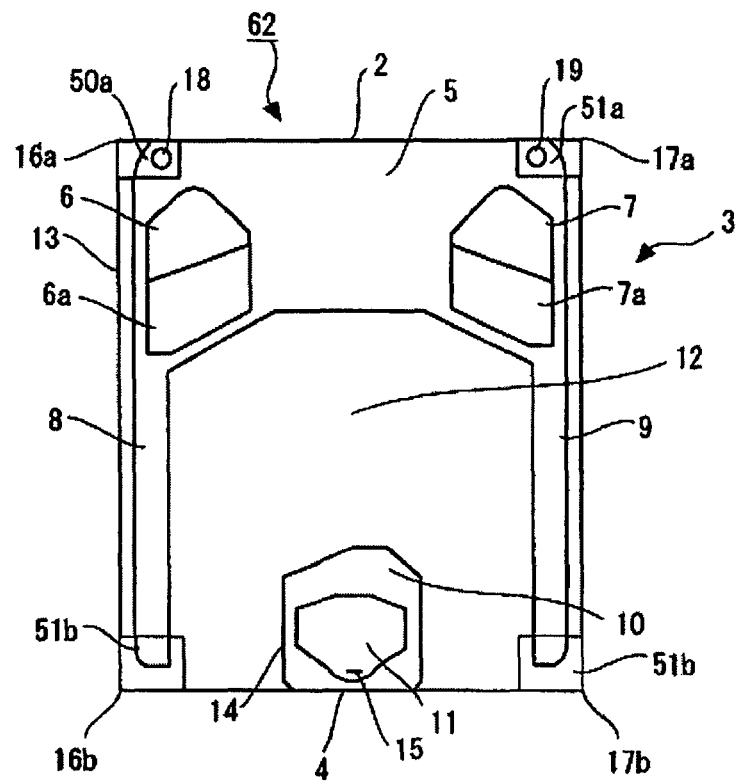
FIG. 13 is a plan view showing the magnetic head slider according to the third embodiment of the present invention.

A magnetic head slider according to a third embodiment of the present invention will be described. FIGS. 12 and 13 are a perspective view and a plan view, respectively, showing the magnetic head slider according to the third embodiment of the present invention. A magnetic head slider 62 according to the third embodiment of the present invention includes leading corner carbon protective films 50a, 51a and trailing corner carbon protective films 50b, 51b according to the first and second embodiment, respectively. This arrangement achieves the effects of both the first and the second embodiments of the present invention. It can be said that the magnetic head slider 62 according to the third embodiment of the present invention is an excellent embodiment in that contact damage to the disk recording medium 101 can be reduced for vibration in all directions of the magnetic head slider 62. The vibration mode of the magnetic head slider 62 varies depending on the position of a pivot 30, dispositions of rail surfaces, or the like of the magnetic head slider 62. Accordingly, it is preferable that the most effective position of forming the corner carbon protective film be selected.

Figure 14:
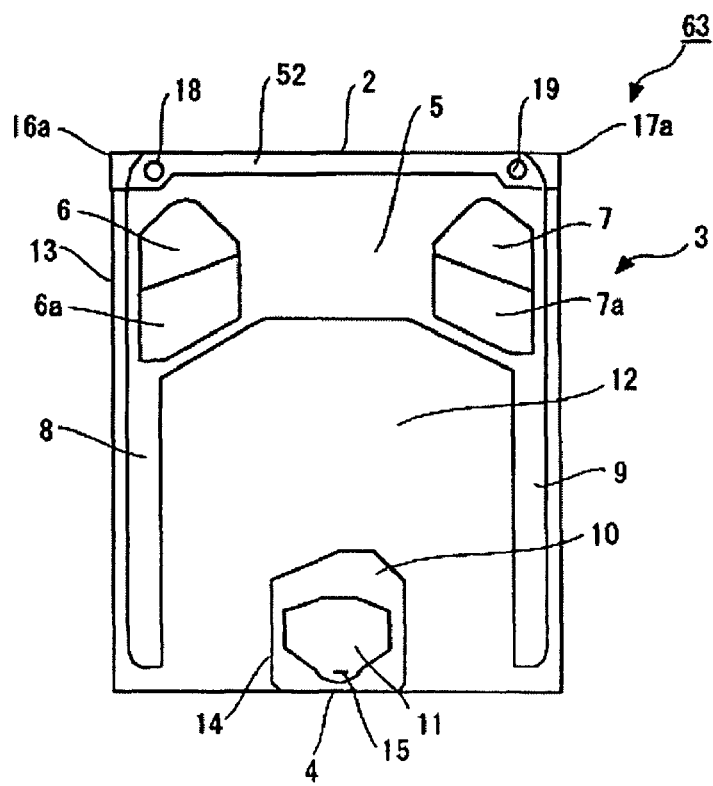
FIG. 14 is a plan view showing a magnetic head slider according to a fourth embodiment of the present invention.

FIG. 14 is a plan view showing a magnetic head slider 63 according to a fourth embodiment of the present invention. In the magnetic head slider 1 according to the first embodiment of the present invention, the leading corner carbon protective films 50a, 51a are formed only on areas near the leading side slider corner portions 16a, 17a thereof, respectively. In the magnetic head slider 63 according to the fourth embodiment of the present invention, on the other hand, a leading edge carbon protective film 52 is formed continuously near the edge of a front step bearing surface 5 extending along a leading end 2. The leading edge carbon protective film 52 may be formed intermittently in consideration of flying characteristics on an ABS 3. The magnetic head slider 63 according to the fourth embodiment achieves a new effect of reducing dust and dirt entering a gap between the ABS 3 of the magnetic head slider 63 and the disk recording medium 101, in addition to the effect of reducing disk damage.

Specifically, an amount of opening that would allow entry of dust and dirt results from a depth of 200 nm from the leading side rail surfaces 6, 7 of the front step bearing surface 5 plus the flying height of a flying posture. In the magnetic head slider 63 according to the fourth embodiment, a wall of the leading edge carbon protective film 52 is formed to have a thickness of 30 nm. The leading edge carbon protective film 52 therefore reduces the amount of opening by the film thickness, that is, for example, by 30 nm. As a result, dust and dirt entering the magnetic head slider 63 can be reduced. In this way, in the magnetic head slider 63 of the fourth embodiment, the similar effects as those achieved by the first embodiment can be achieved. It is further possible to achieve an effect of inhibiting entry of dust and dirt generated as a result of contact with the disk recording medium 101 made due to slider vibration.

Figure 15:
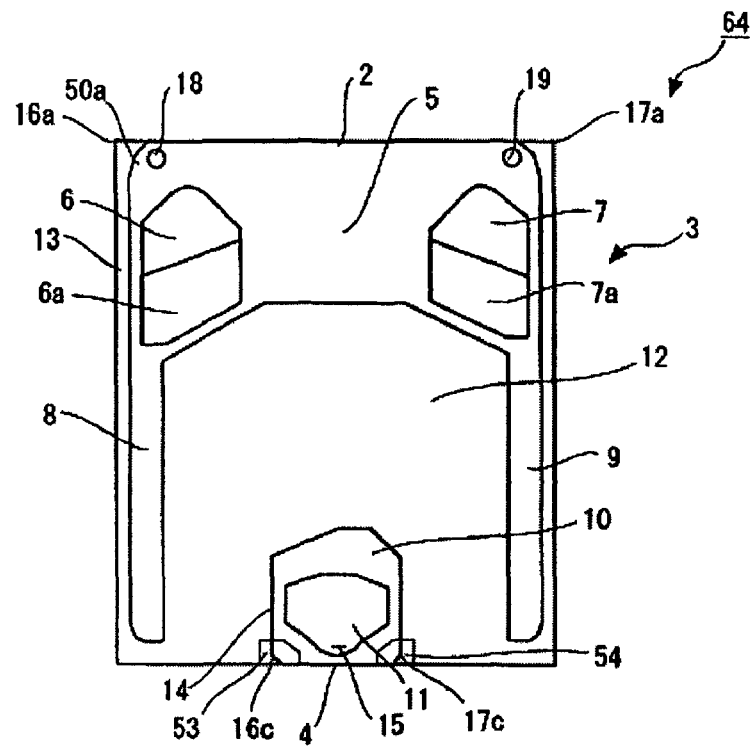
FIG. 15 is a plan view showing a magnetic head slider according to a fifth embodiment of the present invention.

FIG. 15 is a plan view showing a magnetic head slider according to a fifth embodiment of the present invention. Unlike the trailing corner carbon protective films 50*b*, 51*b* of the magnetic head slider 61 according to the second embodiment, a magnetic head slider 64 according to the fifth embodiment includes a carbon protective film formed on a rear step bearing surface 11 of a rear pad 14. Specifically, referring to FIG. 15, the magnetic head slider 64 includes rear pad corner carbon protective films 53, 54 formed on corner portions, respectively, of the rear pad 14 on the side of a trailing end 4. The other structural configurations are the same as those of the magnetic head slider 64 according to the second embodiment. In the magnetic head slider 64 according to the fifth embodiment, the rear pad corner carbon protective films 53, 54 are formed on the following portions. Specifically, the portions include a portion of a rear step bearing surface 10 of the rear pad 14 on the side of trailing end 4, and sub-portions of rear step bearing surface corner portions 16*c*, 17*c* or vertices of the corner portions.

The fifth embodiment is effective in reducing disk damage caused by vibration in the roll direction as well as the pitch direction particularly in the case where the flying height on the side of a leading end 2 is greater than that on the side of the trailing end 4 and the magnetic head slider 64 rises in the slider longitudinal direction.

Figure 16:
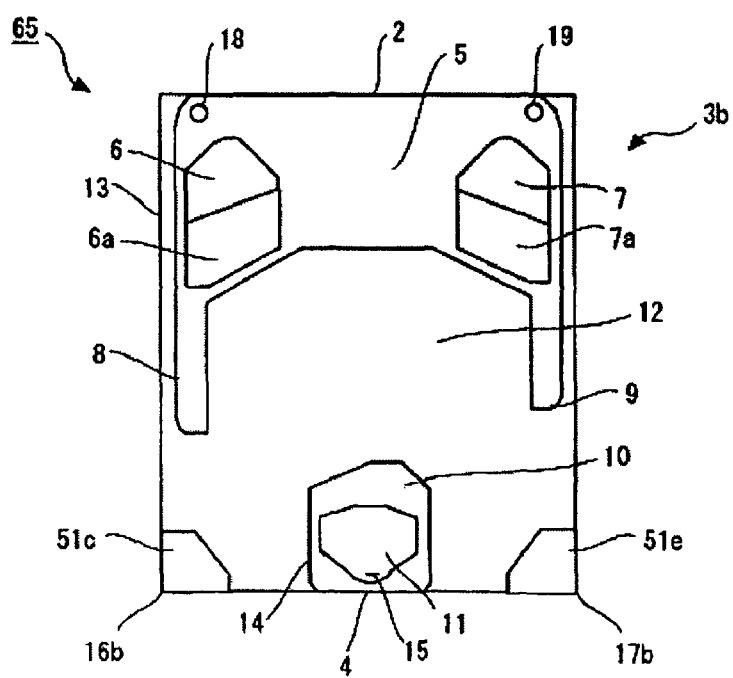
FIG. 16 is a plan view showing a magnetic head slider according to a sixth embodiment of the present invention.
Figure 17:
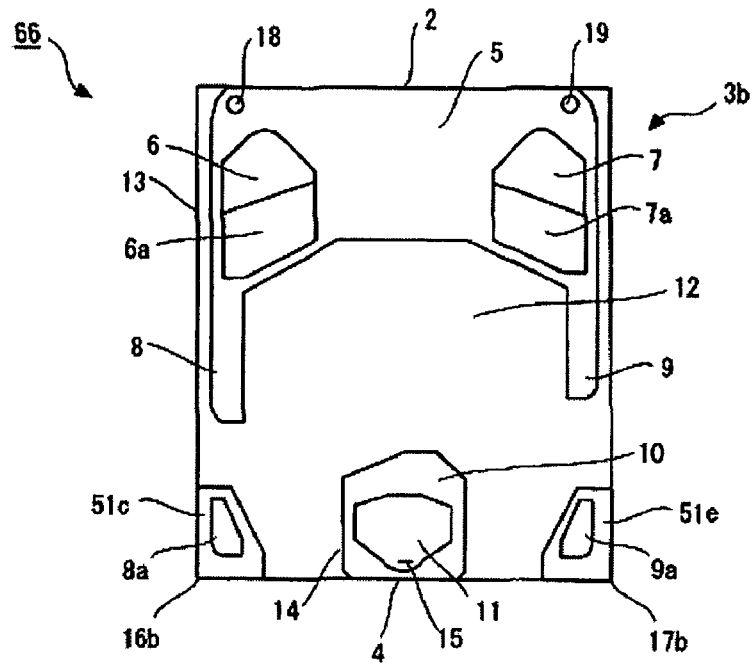
FIG. 17 is a plan view showing a magnetic head slider according to a seventh embodiment of the present invention.

FIGS. 16 and 17 are plan views showing a magnetic head slider according to sixth and seventh embodiments of the present invention, respectively. Each of the magnetic head sliders according to the sixth and the seventh embodiment differs from the magnetic head slider 1 of the first embodiment in that an ABS 3*b* has short side step bearing surfaces 8, 9. Magnetic head sliders 65, 66 having such short side step bearing surfaces 8, 9 have a characteristic that makes small dependence thereof on a rotational speed of the disk recording medium 101.

The magnetic head slider 65 has trailing corner carbon protective films 51*c*, 51*e* on regions including trailing side slider corner portions 16*b*, 17*b*, respectively, on the side of a trailing end 4. The magnetic head slider 66 has island trailing-side side pads 8*a*, 9*a* near a trailing end 4 on lines extending from the side step bearing surfaces 8, 9, respectively, toward the trailing end 4. Trailing corner carbon protective films 51*c*, 51 *e* are formed on corner portions including the trailing side side pads 8*a*, 9*a*, respectively. Forming these trailing corner carbon protective films 51*c*, 51 *e* achieves an effect of reducing damage to the disk recording medium 101.

The present invention is not limited to the aforementioned embodiments and can be implemented in various manners without departing from the spirit thereof. For instance, it goes without saying that the following modifications are possible as well. The corner carbon protective films according to the first to seventh embodiments described in the foregoing may be embodied according to a single mode of implementation or a combination of two or more modes. For example, depending on the shape of the ABS, operating environment, or the like, only either one of the leading corner carbon protective films 50*a*, 51*a* may be formed. Even if a plurality of carbon protective films are provided, a highly reliable magnetic head slider can be provided without requiring any additional manufacturing processes or involving an increased manufacturing cost. In the aforementioned embodiments of the present invention, pico sliders have been described as exemplary cases. It should, however, be noted that the present invention can be applied to femto sliders or the like, in addition to the pico sliders.

In any of the magnetic head sliders according to the first to seventh embodiments described above, the carbon protective films are formed at portions, e.g., slider corner portions or the like of the magnetic slider, that are liable to come into contact with the disk recording medium 101. The carbon protective films have an appropriate thickness, a higher hardness and a lower coefficient of friction than the slider material. These protective films have an appropriate thickness at portions of the magnetic head sliders that are more likely to contact the disk recording medium 101, including the slider corner portions. This arrangement achieves an effect of reducing damage to the disk recording medium 101 should there be a contact therewith. The continuous step surfaces 6*a*, 7*a* are formed on the leading side rail surfaces 6, 7, respectively, as described above.

As described in the foregoing, the present invention achieves the effect of reducing damage to the disk by forming the damage preventive protective films formed of, for example, DLC or the like, regardless of the presence or absence of the continuous step surfaces 6*a*, 7*a*. The effect of stabilizing the flying height in the magnetic head slider having the continuous step surfaces 6*a*, 7*a* will be described by way of example of the magnetic head slider 1 according to the first embodiment. The damage preventive protective films according to the present invention may be applied to a compact magnetic head slider that can inhibit a decrease in the flying height under low pressure environment, such as high altitudes or the like to be described in the following. Such an application can enhance reliability of the magnetic head slider even further.

The magnetic head slider tends to be reduced in size as the storage density increases. A type of slider of a tiny rectangle measuring 1 mm or less in length and 1 mm or less in width is known as the femto slider. One may, for example, measure 0.85 mm in length, 0.7 mm in width, and 0.23 mm in thickness. Generally speaking, the smaller the area of the slider, the smaller the area of the deep groove surface 12 adaptable to generate a pressure lower than the atmospheric pressure (negative pressure). This decreases the magnitude of the negative pressure to be generated by the slider. Then, the drop in the flying height at high altitudes becomes larger. When the magnetic disk is made smaller in diameter with the recent trend toward more and more compact magnetic disk drives, the peripheral speed of the disk decreases. This helps make the negative pressure generated by the slider diminish even further. This serves as another factor contributing to an even greater decrease in the flying height at high altitudes. A growing trend toward increased mobility of devices, such as notebook computers and the like, is another factor that makes it necessary to promote inhibition of drop in the flying height of the slider under low pressure conditions, such as in an airplane or the like.

Under these circumstances, a slider rail area required for achieving a predetermined flying height could be reduced by forming the step surfaces 6a, 7a continuous in the slider longitudinal direction on the leading side rail surfaces 6, 7, respectively, as in the magnetic head slider 1 shown in FIG. 1.

Specifically, the step surfaces 6a, 7a having a continuous length are formed on the leading side rail surfaces 6, 7, respectively. This results in a sequence of the following events occurring. Specifically, an air stream, the pressure of which is boosted by the respective steps on the leading side rail surfaces 6, 7, generates a pressure for making the slider fly on the leading side rail surfaces 6, 7. The pressure of the air stream is further boosted by the steps of the step surfaces 6a, 7a, which results in an even greater pressure being generated on the step surfaces 6a, 7a. An air stream that flows from the rear step bearing surface 10, on the other hand, undergoes a pressure boost at the step of the trailing side rail surface 11. The air stream then generates a pressure on the trailing side rail surface 11.

The length of the step surfaces 6a, 7a in the slider longitudinal direction should be a continuous length of 50 μm or more, preferably 100 μm or more, so that a large positive pressure can be generated. The maximum lengths of the step surfaces 6a, 7a, on the other hand, must be smaller than the lengths of the leading side rail surfaces 6, 7, respectively, since the step surfaces 6a, 7a are formed on the leading side rail surfaces 6, 7, respectively.

As described above, the steps for boosting pressure in two stages provided by the leading side rail surfaces 6, 7 and the step surfaces 6a, 7a allow a large lifting force to be obtained. It therefore becomes possible to reduce dimensions of the leading side rail surfaces 6, 7 and the trailing side rail surface 11 required for achieving the predetermined flying height. The decrease in the flying height at high altitudes can therefore be reduced as will be described later. Specifically, if the decrease in the negative pressure involved with reduction in pressure is made large, it acts to increase the flying height. From a total viewpoint, therefore, the decrease in the flying height as a result of reduced pressure is made small. To enlarge the decrease in the negative pressure involved with reduced pressure, it is effective to make large the negative pressure under normal pressure. This arrangement is achievable in a slider in which the area of the rail surfaces can be decreased as described above. Such an arrangement is particularly effective for 2.5-inch or smaller compact magnetic disk drives.

A plurality of minute protrusion pads are formed on the leading side rail surfaces to enable reduced adhesion during starting. The minute protrusion pads are unable to influence the lifting force of the slider. Accordingly, a large lifting force cannot be obtained. It is therefore required that the step surfaces 6a, 7a be formed to continue a predetermined length in the slider longitudinal direction. To obtain a required boost pressure, a certain value of step height is required for the step surfaces 6a, 7a. It is also preferable that the area of the step surfaces 6a, 7a be optimized. Reasons for these requirements will be described in the following.

When flying over the disk recording medium 10 through an air stream, the magnetic head slider 1 takes a posture, in which the flying height on the side of the leading end 2 is higher than the flying height on the side of the trailing end 4. Accordingly, the flying height on a terminal end (on the side of the trailing end 4) of the trailing side rail surface 11 provided with the magnetic transducer 15 is the smallest.

If the step surfaces 6a, 7a as shown in FIG. 2 are formed, on the other hand, the following occurs. Specifically, if the flying height of the step surfaces 6a, 7a on the side of the trailing end 4 is smaller than the flying height of the trailing side rail surface 11 on the side of the trailing end 4, the step surfaces 6a, 7a may come into contact with the disk recording medium 101. If such a thing happens, the magnetic head slider 1 vibrates largely, and in the worst case, crashes. Accordingly, it becomes necessary to set the flying posture of the slider and the height of the step surfaces 6a, 7a to ensure that the flying height of the step surfaces 6a, 7a on the side of the trailing end 4 does not become smaller than the flying height of the trailing side rail surface 11 on the side of the trailing end 4.

The applicant of the present invention has found the following in terms of the so-called femto slider measuring 0.85 mm in length, 0.7 mm in width, and 0.23 mm in thickness, which slider is a magnetic head slider having a depth from the leading side rail surfaces 6, 7 to the front step bearing surface 5 and the depth from the trailing side rail surface 11 to the rear step bearing surface 10 being 200 nm, and a step height of the step surfaces 6a, 7a being 20 nm. Specifically, using a 2.5-inch HDD with a rotational speed of 4200 rpm, calculations were made of a distribution of the flying height in the radial direction of the disk at an altitude of 0 m (flying profile) and a flying profile at an altitude of 3000 m. As a result, the decrease in the flying height at the altitude of 3000 m could be made to about 6 to 7% of the flying height at the altitude of 0 m. It should be noted that, since proper operation of the disk drive must be guaranteed to an altitude of at least 3000 m (about 0.7 atm), it is necessary to prevent decrease in the flying height at the altitude of 3000 m as much as possible.

If the step surfaces are formed starting with the leading end, instead of on the leading side rail surfaces, or if a plurality of small pads are formed on the leading side rail surfaces, on the other hand, a pressure boost effect of the air stream becomes small in either case. There is also a sizable amount of decrease of 17 to 20% in the flying height at the altitude of 3000 m in either case.

The optimum step height of the step surfaces 6a, 7a varies according to the dimension of the slider. More generally, it is preferable that the following formula holds true:

$$H/L < 5.9 \times 10^{-5} \quad (1)$$

where the overall length of the sliders including the femto slider and pico slider is L and the height of the step surfaces 6a, 7a is H. The reasons will be given below.

Figure 18:
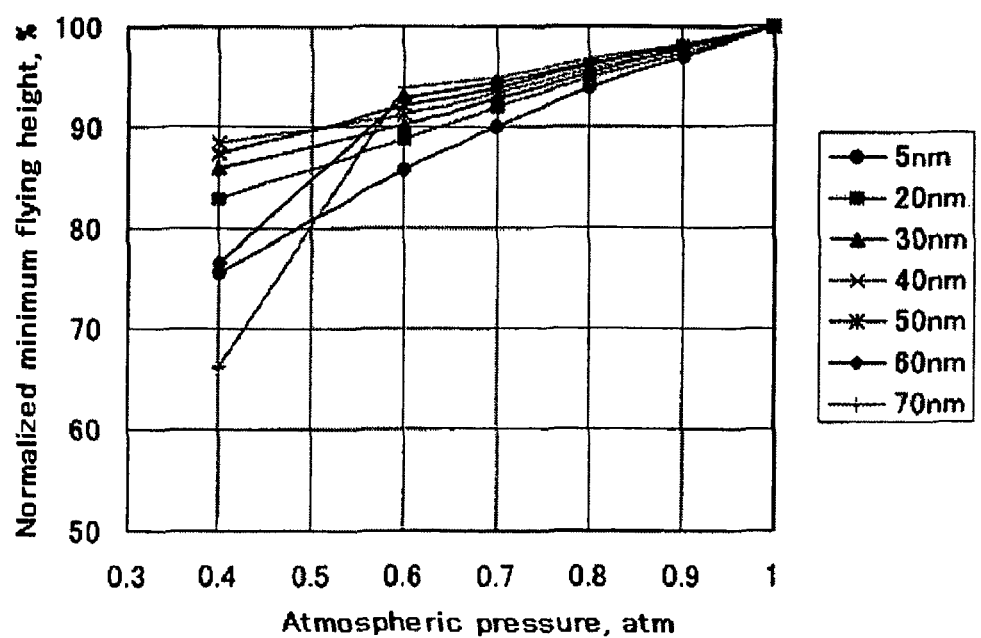
FIG. 18 is a chart showing the relationship between a flying height of the magnetic head slider according to the first embodiment of the present invention and atmospheric pressure with a step height of step surfaces used as a parameter.

As described earlier, to ensure reliability of the magnetic disk drive, the flying height at the terminal end of the step surfaces 6a, 7a must be higher than the flying height at the terminal end of the trailing side rail surface. FIG. 18 shows results of calculations made of the relationship between the flying height and ambient pressure with the step height of the step surfaces 6a, 7a used as a parameter. The relationship between the flying height and ambient pressure is concerned with the magnetic head slider in which the step surfaces 6a, 7a are formed on the leading side rail surfaces 6, 7. In the chart shown in FIG. 18, the ordinate represents the flying height at the terminal end of the step surfaces 6a, 7a or the lowest flying height of all flying height values at the terminal end of the trailing side rail surface under each of different conditions, normalized using the minimum flying height (flying height at the terminal end of the trailing side rail surface) under atmospheric pressure.

Referring to FIG. 18, the minimum flying height decreases with the drop in atmospheric pressure, that is, with the increase in altitude, regardless of the step height of the step surfaces 6a, 7a. In particular, with the step height of 60 nm or more, there is a sudden drop of the minimum flying height at 0.6 atm. This is because the drop in the ambient pressure causes the slider's flying posture to be low, which shifts the position of the minimum flying height from the terminal end of the trailing side rail surface 11 to the terminal end of the step surfaces 6a, 7a. This should be avoided from the reliability viewpoint of the magnetic disk drive. Accordingly, the height of the step surfaces 6a, 7a should be lower than 60 nm. Preferably, the step height of the step surfaces 6a, 7a should be 50 nm or less.

If the minimum flying height under normal pressure is 10 nm or less, on the other hand, it becomes necessary to keep the decrease in the flying height at an altitude of 3000 m equal to, or less than, at least 10% (1 nm). It is then necessary to set the step height of the step surfaces 6a, 7a to a value of at least 5 nm or more. Since measurement accuracy of the flying height is about ±1 nm, it is also necessary to keep the amount of decrease in the flying height less than about ±1 nm.

Specifically, the step surfaces 6a, 7a are required in order to reduce the amount of decrease in the flying height at high altitudes. If the step height of the step surfaces 6a, 7a is excessively large, however, the terminal end position of the step surfaces 6a, 7a takes the minimum flying height. The step height of the step surfaces 6a, 7a should preferably be 5 to 50 nm for the femto slider. The step height of the step surfaces may be about 10 nm or more if the steps are formed simultaneously with the damage preventive protective film as described earlier.

For a pico slider having an overall length of 1.25 mm, the step height of the step surfaces 6a, 7a must be 74 nm at its maximum if the posture during flying is the same as that of the aforementioned femto slider. By applying the formula (1) to the relationship between the overall length L of the slider and the height H of the step surfaces as described in the foregoing, the flying height at the terminal end position of the step surfaces 6a, 7a can be avoided from becoming the minimum flying height.

The pivot 30, at which a load is applied to the magnetic head slider, is located at a point near the leading end 2 relative to the center of the slider and opposite the step surfaces 6a, 7a. This arrangement allows a moment Mp acting in a direction of decreasing the flying height on the side of the leading end 2 to act when a pressure is decreased which is generated on the step surfaces 6a, 7a at high altitudes. The moment Mp helps keep small the amount of decrease in the flying height on the side of the trailing end 4.

According to the magnetic head slider 1 shown in FIG. 1, the step surfaces 6a, 7a are formed continuously on the leading side rail surfaces 6, 7 formed on the right and left sides of the slider 1, respectively, to be shorter in length than the leading side rail surfaces 6, 7 in the longitudinal direction. The step surfaces 6a, 7a may nonetheless be formed to traverse in a width direction of the slider 1, not only on the leading side rail surfaces 6, 7. This allows the slider to be machined without having to worry about positioning accuracy of the mask.

Elongating the length of the leading side rail surfaces 6, 7 and the step surfaces 6a, 7a helps reduce the decrease in the flying height at high altitudes. In addition, the long leading side rail surfaces 6, 7 and the long step surfaces 6a, 7a increase the stiffness of an air film in the pitch direction. Accordingly, changes in the flying height involved with errors in the pitch attitude angle of the suspension can be reduced.

A pressure boost effect according to the height of the leading side rail surfaces 6, 7 can be achieved as described above. In addition, a pressure boost effect varying with different areas of the leading side rail surfaces 6, 7 can also be obtained. An optimum ratio of the total area of the step surfaces 6a, 7a relative to the total area of the leading side rail surfaces 6, 7 will be described in the following.

Figure 19:
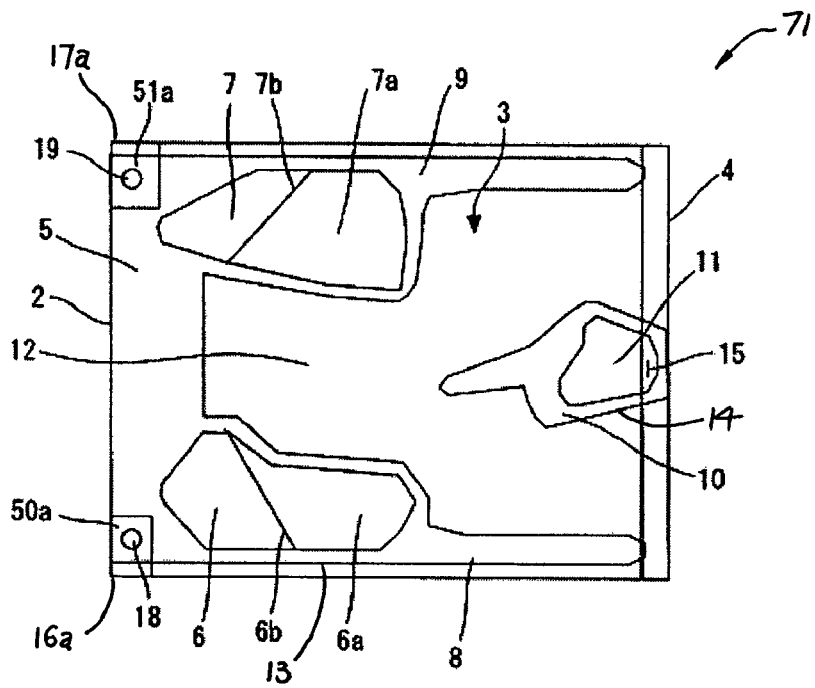
FIG. 19 is a plan view showing a modification of the magnetic head slider according to the first embodiment of the present invention.

FIG. 19 is a plan view showing a modification of the magnetic head slider according to the first embodiment of the present invention. A magnetic head slider 71 shown in FIG. 19 differs from the magnetic head slider 1 shown in FIG. 2 in shapes of a front pad 13, a rear pad 14, leading side rail surfaces 6, 7, step surfaces 6a, 7a, and the like. The magnetic head slider 71 as the modified example, however, achieves the same effects as the magnetic head slider according to the first embodiment of the present invention, since the slider 71 includes, as the magnetic head slider according to the first embodiment does, leading pads 18, 19 disposed near leading side slider corner portions 16a, 17a on the side of a leading end 2, and leading corner carbon protective films 50a, 51a disposed as damage preventive protective films in regions including the leading pads 18, 19.

Figure 20:
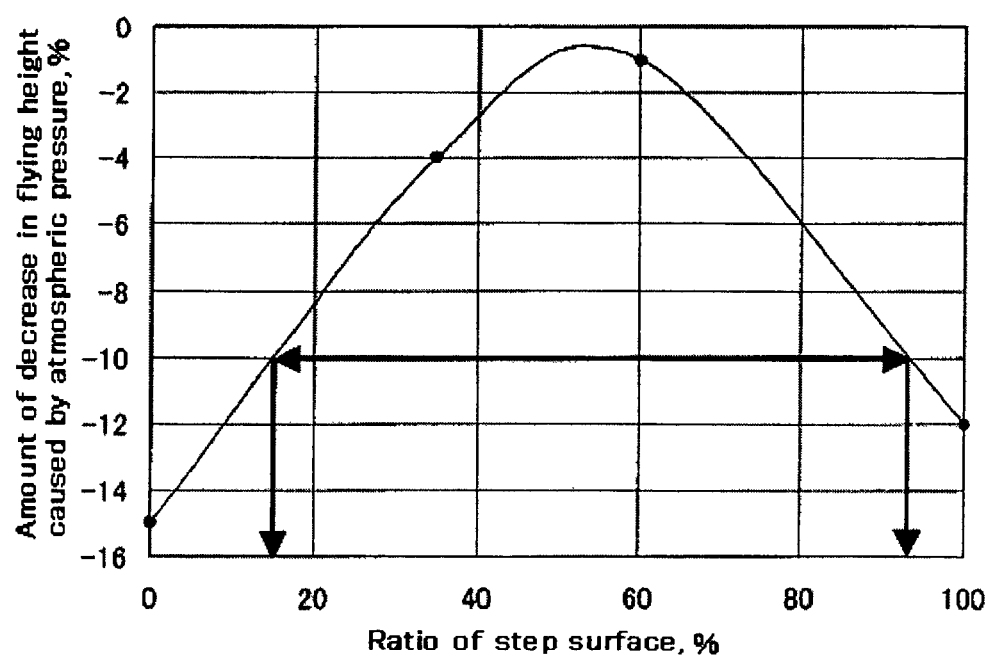
FIG. 20 is a chart showing the relationship between an amount of decrease in the flying height with varying altitudes and the ratio of the area of the step surface to the area of the leading side rail surfaces for the modification of the magnetic head slider according to the first embodiment of the present invention.

FIG. 20 shows results of the amount of decrease in the flying height at an altitude of 0 m and an altitude of 3000 m. The changes in the amount of decrease in the flying height were obtained by moving, in the magnetic head slider 71, the position of respective step heights 6b, 7b of the step surfaces 6a, 7a in the slider's longitudinal direction, thereby varying the ratio of the total area of the step surfaces 6a, 7a relative to the total area of the leading side rail surfaces 6, 7 (that is, the ratio of the step surfaces). In the chart shown in FIG. 20, the ordinate represents the ratio of the amount of decrease in the flying height with the increasing altitude to the flying height at an altitude of 0 m. To keep the amount of decrease in the flying height with the increasing altitude within 10% of the flying height at an altitude of 0 m, it is necessary to achieve a ratio of area of 18 to 92% as shown in FIG. 20.

As described in the foregoing, the decrease in the flying height of the magnetic head slider 1 at high altitudes can be reduced by providing the HDD with the magnetic head slider 1 that includes the step surfaces 6a, 7a on the respective leading side rail surfaces 6, 7 and the damage preventive protective films having a high hardness and a low coefficient of friction on the corner portions and/or edge portions thereof. The HDD may be used in an environment in which the flying height decreases, such as at high altitudes. The HDD may also be subjected to disturbance vibration, or dust and dirt may subsequently be generated therein. Any of these conditions can cause the magnetic head slider 1 to vibrate and thus come into contact with the disk recording medium 101. Should this happen, damage to the disk recording medium 101 can be reduced and thus reliability of the magnetic disk drive can be enhanced.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head slider having a magnetic transducer for writing and reading data to and from a spinning disk, the magnetic head slider comprising:
   a damage preventive protective film which has a smaller coefficient of friction than a slider base material and a film thickness of about 10 nm or more, and which is formed on slider corner portions on a side of an air bearing surface on a side of a leading end, and/or on corner portions, on a side of a trailing end, of a rear pad on which the magnetic transducer is disposed; and one or a plurality of leading side rail surfaces formed on a step bearing surface, wherein a step surface is formed on the leading side rail surface, the step surface having a predetermined height H from the leading side rail surface and being formed continuously in a direction from the leading end toward the trailing end, and wherein the damage preventive protective film has a film thickness equal to the predetermined height H.

2. The magnetic head slider according to claim 1, further comprising:

a front pad including a step bearing surface disposed on a surface of the base material on a side of the leading end and one or a plurality of leading side rail surfaces formed on the step bearing surface; and a rear pad including a rear step bearing surface disposed on the surface of the base material on the trailing end and across the front pad and a negative pressure generating deep groove surface, and a trailing side rail surface formed on the rear step bearing surface;

wherein the leading side rail surface and the trailing side rail surface are formed on substantially the same level;

wherein the step bearing surface and the rear step bearing surface are formed with a predetermined depth from the leading side rail surface and the trailing side rail surface; and wherein the damage preventive protective film has a film thickness equal to the predetermined depth or less.

3. The magnetic head slider according to claim 2, further comprising:

a leading pad disposed near respective vertices of the slider corner portions on the step bearing surface on the side of the leading end;

wherein the damage preventive protective film is formed in a region including a top surface of the leading pad.

4. The magnetic head slider according to claim 3, comprising:

deep groove surfaces formed on both sides of the front pad to include the corresponding slider corner portions in a direction from the leading end toward the trailing end and to have a depth substantially the same as the negative pressure generating deep groove surface;

wherein the damage preventive protective film is formed on a region including each of the respective deep groove surfaces on the slider corner portions.

5. The magnetic head slider according to claim 4, wherein the damage preventive protective film is formed continuously or intermittently along the leading end of the front pad.

6. The magnetic head slider according to claim 4, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

7. The magnetic head slider according to claim 3, wherein the damage preventive protective film is formed continuously or intermittently along the leading end of the front pad.

8. The magnetic head slider according to claim 3, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

9. The magnetic head slider according to claim 2, wherein the damage preventive protective film is formed continuously or intermittently along the leading end of the front pad.

10. The magnetic head slider according to claim 2, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

11. The magnetic head slider according to claim 2, comprising:

deep groove surfaces formed on both sides of the front pad to include the corresponding slider corner portions in a direction from the leading end toward the trailing end and to have a depth substantially the same as the negative pressure generating deep groove surface;

wherein the damage preventive protective film is formed on each of the respective deep groove surfaces on the slider corner portions.

12. The magnetic head slider according to claim 1, wherein the damage preventive protective film has a value of Vickers hardness of 3000 Hv or higher.

13. A magnetic head slider having a magnetic transducer for writing and reading data to and from a spinning disk, the magnetic head slider comprising:

a damage preventive protective film which has a higher hardness than a slider base material and a film thickness of about 10 nm or more, and which is formed on slider corner portions on a side of an air bearing surface on a side of a leading end, and/or on corner portions, on a side of a trailing end, of a rear pad on which the magnetic transducer is disposed; and one or a plurality of leading side rail surfaces formed on the a step bearing surface, wherein a step surface is formed on the leading side rail surface, the step surface having a predetermined height H from the leading side rail surface and being formed continuously in a direction from the leading end toward the trailing end, and wherein the damage preventive protective film has a film thickness equal to the predetermined height H.

14. The magnetic head slider according to claim 13, further comprising:

a front pad including a step bearing surface disposed on a surface of the base material on a side of the leading end and one or a plurality of leading side rail surfaces formed on the step bearing surface; and a rear pad including a rear step bearing surface disposed on the surface of the base material on the trailing end and across the front pad and a negative pressure generating deep groove surface, and a trailing side rail surface formed on the rear step bearing surface;

wherein the leading side rail surface and the trailing side rail surface are formed on substantially the same level;

wherein the step bearing surface and the rear step bearing surface are formed with a predetermined depth from the leading side rail surface and the trailing side rail surface; and wherein the damage preventive protective film has a film thickness equal to the predetermined depth or less.

15. The magnetic head slider according to claim 14, further comprising:

a leading pad disposed near respective vertices of the slider corner portions on the step bearing surface on the side of the leading end;

wherein the damage preventive protective film is formed in a region including a top surface of the leading pad.

16. The magnetic head slider according to claim 15, comprising:

deep groove surfaces formed on both sides of the front pad to include the corresponding slider corner portions in a direction from the leading end toward the trailing end and to have a depth substantially the same as the negative pressure generating deep groove surface;

wherein the damage preventive protective film is formed on a region including each of the respective deep groove surfaces on the slider corner portions.

17. The magnetic head slider according to claim 16, wherein the damage preventive protective film is formed continuously or intermittently along the leading end of the front pad.

18. The magnetic head slider according to claim 16, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

19. The magnetic head slider according to claim 15, wherein the damage preventive protective film is formed continuously or intermittently along the leading end of the front pad.

20. The magnetic head slider according to claim 15, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

21. The magnetic head slider according to claim 14, wherein the damage preventive protective film is formed continuously or intermittently along the leading end of the front pad.

22. The magnetic head slider according to claim 14, wherein the step bearing surface includes a front step bearing surface and a side step bearing surface, and the side step bearing surface is formed to extend up to a point near the trailing end; and wherein the damage preventive protective film is formed on a region including each of the vertices of the slider corner portions and the trailing end of the side step bearing surface.

23. The magnetic head slider according to claim 14, comprising:

deep groove surfaces formed on both sides of the front pad to include the corresponding slider corner portions in a direction from the leading end toward the trailing end and to have a depth substantially the same as the negative pressure generating deep groove surface;

wherein the damage preventive protective film is formed on each of the respective deep groove surfaces on the slider corner portions.

24. The magnetic head slider according to claim 13, wherein the damage preventive protective film has a value of Vickers hardness of 3000 Hv or higher.

25. A magnetic disk drive, comprising:

a spinning disk;

a magnetic head slider including a magnetic transducer for writing and reading data to and from the disk;

a suspension configured to hold the magnetic head slider;

an arm configured to support the suspension; and a driving portion configured to drive the arm;

wherein the magnetic head slider includes a damage preventive protective film which has a smaller coefficient of friction than a slider base material and a film thickness of about 10 nm or more, and which is formed on slider corner portions on a side of an air bearing surface on a side of a leading end, and/or on corner portions, on a side of a trailing end, of a rear pad on which the magnetic transducer is disposed, the magnetic head slider further comprising one or a plurality of leading side rail surfaces formed on a step bearing surface, wherein a step surface is formed on the leading side rail surface, the step surface having a predetermined height H from the leading side rail surface and being formed continuously in a direction from the leading end toward the trailing end, and wherein the damage preventive protective film has a film thickness equal to the predetermined height H.

26. The magnetic disk drive according to claim 25, wherein the magnetic head slider comprises:

a front pad including a step bearing surface disposed on a surface of the base material on a side of a leading end and one or a plurality of leading side rail surfaces formed on the step bearing surface; and a rear pad including a rear step bearing surface disposed on the surface of the base material on a trailing end and across the front pad and a negative pressure generating deep groove surface, and a trailing side rail surface formed on the rear step bearing surface;

wherein the leading side rail surface and the trailing side rail surface are formed on substantially the same level;

wherein the step bearing surface and the rear step bearing surface are formed with a predetermined depth from the leading side rail surface and the trailing side rail surface; and wherein the damage preventive protective film has a film thickness equal to the predetermined depth or less.

* * * * *